(12) United States Patent
Ishii et al.

(10) Patent No.: US 8,806,864 B2
(45) Date of Patent: Aug. 19, 2014

(54) TRANSMISSION

(75) Inventors: Norihiro Ishii, Hyogo (JP); Koji Iwaki, Hyogo (JP)

(73) Assignee: Kanzaki Kokyukoki Mgf. Co., Ltd., Amagasaki-shi, Hyogo (JP)

( * ) Notice: Subject to any disclaimer, the term of this patent is extended or adjusted under 35 U.S.C. 154(b) by 939 days.

(21) Appl. No.: 12/914,474

(22) Filed: Oct. 28, 2010

(65) Prior Publication Data

US 2011/0099993 A1    May 5, 2011

(30) Foreign Application Priority Data

Oct. 30, 2009 (JP) ................................ 2009-251135
Nov. 9, 2009 (JP) ................................ 2009-256570
Aug. 5, 2010 (JP) ................................ 2010-176801

(51) Int. Cl.
*F16D 39/00* (2006.01)
*F16H 47/04* (2006.01)
*F16H 47/02* (2006.01)
*F16H 37/08* (2006.01)

(52) U.S. Cl.
CPC ............... *F16H 47/04* (2013.01); *F16H 47/02* (2013.01); *F16H 2037/0886* (2013.01)
USPC ............................................. 60/488; 60/487

(58) Field of Classification Search
USPC ........ 60/439, 487, 488; 475/83, 198, 225, 23; 74/730.1
See application file for complete search history.

(56) References Cited

U.S. PATENT DOCUMENTS 4,373,359 A    2/1983    Ehrlinger et al.
4,939,900 A *   7/1990    Furumoto et al. ............... 60/456

(Continued)

FOREIGN PATENT DOCUMENTS

JP    S588853    1/1983
JP    H10-167687 A    6/1998

(Continued)

OTHER PUBLICATIONS

Extended European Search Report for EP Application No. 10188869.1-2421, European Patent Office, mailed Feb. 14, 2011, 5 pages.

(Continued)

*Primary Examiner* — Ned Landrum
*Assistant Examiner* — Logan Kraft
(74) *Attorney, Agent, or Firm* — Sterne, Kessler, Goldstein & Fox P.L.L.C.

(57) ABSTRACT

A transmission comprises a casing, an output element, a hydrostatic stepless transmission unit (HST) and a forward/backward traveling direction selecting unit (reverser). The output element is supported by the casing. The HST is disposed in the casing so as to be driven by a drive source disposed outside of the casing. The HST includes a pump shaft and a motor shaft member. The pump shaft is drivingly connected to the drive source. The motor shaft member is fitted around the pump shaft coaxially to the pump shaft so as to be rotatable relative to the pump shaft, thereby constituting a hydraulic pump and a hydraulic motor centered on the pump shaft and the motor shaft member. An axially distal end of the motor shaft member is disposed on the axially proximal side of an axially distal end of the pump shaft so that axial ends of the pump shaft are the axially most distal ends of the HST in the axial direction of the pump shaft. The reverser is disposed in the casing so as to transmit power outputted from the HST to the output element. The reverser includes a forward-traveling drive train, a backward-traveling drive train, and a clutch for selecting either the forward-traveling drive train or the backward traveling drive train to transmit the power outputted from the motor shaft member to the output element. The reverser and the output element are entirely disposed between the axial ends of the pump shaft in the axial direction of the pump shaft.

11 Claims, 20 Drawing Sheets

(56) References Cited

U.S. PATENT DOCUMENTS

| | | | |
|---|---|---|---|
| 4,951,469 A * | 8/1990 | Hayashi et al. | 60/489 |
| 2004/0182076 A1 * | 9/2004 | Shiozaki et al. | 60/487 |
| 2009/0095102 A1 | 4/2009 | Koga et al. | |

FOREIGN PATENT DOCUMENTS

| | | |
|---|---|---|
| JP | 2003-14079 A | 1/2003 |
| JP | 1 449 703 A2 | 8/2004 |
| JP | 2006076451 | 3/2006 |
| JP | 2008309325 | 12/2008 |
| WO | WO2008/106929 A1 | 9/2008 |

OTHER PUBLICATIONS

Office Action with English Translation issued Dec. 17, 2013, in Japanese Patent Application No. 2010-176801, 4 pages.

* cited by examiner

TRANSMISSION

BACKGROUND OF THE INVENTION

1. Field of the Invention

The present invention relates to a vehicle-driving power transmission provided with a hydrostatic stepless transmission (hereinafter, "HST"). Especially, the present invention relates to an integral transmission, which is defined as integrally including an HST and a forward/backward traveling direction selecting unit (reverser) in this application.

2. Background Art

As disclosed by JP H10-167687 A, there is a conventional forklift equipped with an HST serving as a transmission for transmitting power of an engine serving as a prime mover to drive wheels. In this forklift, a hydraulic pump is directly attached to the engine, a hydraulic motor is directly attached to a transaxle incorporating a differential mechanism, and the hydraulic pump and motor are fluidly connected to each other via hydraulic fluid pipes so as to constitute the HST. This HST is not easily assembled because the hydraulic pump and the hydraulic motor are attached to different places separately from each other.

In this regard, there is a conventional HST whose hydraulic pump and motor are assembled integrally as disclosed by JP 2003-14079 A. In this HST, a cylinder block is fixed on a pump shaft, pump plungers and motor plungers are fitted into respective pump and motor cylinder holes bored in the cylinder block so as to be reciprocally movable in parallel to the pump shaft, a pair of fluid passages are formed in the cylinder block so as to be interposed between the pump cylinder holes fitting the pump plungers therein and the motor cylinder holes fitting the motor plungers therein, a movable swash plate serving as a pump swash plate is pressed against heads of the pump plungers projecting outward from one end surface of the cylinder block, and a motor swash plate is formed on a motor shaft member relatively rotatably fitted on the pump shaft and is pressed against heads of the motor plungers projecting outward from the other end surface of the cylinder block, so that the hydraulic pump and motor are made to be coaxial to each other.

Further, the cylinder block is provided therein with spool valves connected to the pump cylinder holes and with spool valves connected to the motor cylinder holes. The spool valves change their slide positions in correspondence to tilting movement of the pump swash plate, thereby changing a flow of hydraulic fluid between higher and lower pressurized fluid passages serving as the pair of fluid passages. The rotary speed of the motor shaft member having the motor swash plate pressed against the motor plungers changes according to change of the flow of hydraulic fluid. More specifically, when the tilt angle of the pump swash plate is zero, i.e., when the pump swash plate is disposed at its neutral position, the rotary speed of the motor shaft member is equal to the rotary speed of the cylinder block (and the pump shaft). The rotary speed of the motor shaft member relative to the cylinder block increases as the pump swash plate is tilted from the neutral position in one direction, and the rotary speed of the motor shaft member relative to the cylinder block decreases as the pump swash plate is tilted from the neutral position in the other direction.

The HST is radially compact with respect to the pump shaft due to the coaxial arrangement of the hydraulic pump and motor. Further, the HST is axially minimized due to the cylinder block which is common to both the hydraulic pump and motor.

This HST is now compared with a typical HST in which hydraulic pump and motor have respective cylinder blocks and a motor shaft serving as an HST output member is fixed to the cylinder block of the hydraulic motor. As for the typical HST, the hydraulic motor is rotated in one direction by tilting a movable swash plate serving as a pump swash plate in one direction from its neutral position, and the hydraulic motor is rotated in the opposite direction by tilting the movable swash plate in the opposite direction from the neutral position. On the contrary, as for the above-mentioned HST having the common cylinder block for the hydraulic pump and motor, the rotary speed of the motor shaft member becomes zero when the pump swash plate reaches a maximum tilt angle in one direction from the neutral position, and the rotary speed of the motor shaft member becomes its maximum when the pump swash plate reaches a maximum tilt angle in the opposite direction from the neutral position, so that the rotational direction of the motor shaft member is constant while the pump swash plate moves between the maximum tilt angle in one direction from the neutral position and the maximum tilt angle in the opposite direction from the neutral position. In other words, as for the HST whose hydraulic pump and motor have respective cylinder blocks, the tilt of the pump swash plate from the neutral position to the maximum tilt angle in one direction provides the variable speed range of output rotation of the HST in one direction, and the tilt of the pump swash plate from the neutral position to the maximum tilt angle in the opposite direction provides the variable speed range of output rotation of the HST in the opposite direction. On the contrary, as for the HST whose hydraulic pump and motor have a common cylinder block, the whole tilt range of the pump swash plate between the maximum tilt angle in one direction from the neutral position and the maximum tilt angle in the opposite direction from the neutral position provides the whole variable speed range of output rotation of the HST in only one direction. Therefore, the HST having a common cylinder block is adapted to be combined with a forward/backward traveling direction selecting device, i.e., reverser, which includes a forward traveling gear train, a backward traveling gear train and a reverser clutch for selecting either the forward or backward traveling gear train, so as to ensure a wide variable speed range of a vehicle in each of forward and backward traveling directions of the vehicle.

BRIEF SUMMARY OF THE INVENTION

In consideration of the above situation, a hydrostatic stepless transmission unit (hereinafter, "HST") and a forward/backward traveling direction selecting device switching unit (hereinafter, "reverser") are desired to be integrally combined so as to constitute an integral vehicle-driving power transmission. In this regard, a small-size vehicle such as a forklift has a narrow space between an axle and a prime mover, such as an engine, and a small width between right and left drive wheels. Therefore, the transmission is desired to be so compact as to be disposed in the limited space and width.

A transmission according to the present invention comprises a casing, an output element, an HST and a reverser. The output element is supported by the casing. The HST is disposed in the casing so as to be driven by a drive source disposed outside of the casing. The HST includes a pump shaft and a motor shaft member. The pump shaft is drivingly connected to the drive source. The motor shaft member is fitted around the pump shaft coaxially to the pump shaft so as to be rotatable relative to the pump shaft, thereby constituting a hydraulic pump and a hydraulic motor centered on the pump shaft and the motor shaft member. The reverser is disposed in the casing so as to transmit power outputted from the HST to the output element. The reverser includes a forward-traveling drive train, a backward-traveling drive train, and a clutch for selecting either the forward-traveling drive train or the backward traveling drive train to transmit the power outputted from the motor shaft member to the output element.

In the above-mentioned transmission, an axially distal end of the motor shaft member is disposed on the axially proximal side of an axially distal end of the pump shaft so that axial ends of the pump shaft are the most distal ends of the HST in the axial direction of the pump shaft. The reverser and the output element are entirely disposed between the axial ends of the pump shaft in the axial direction of the pump shaft.

The HST comprises a cylinder block, a pump plunger, a movable swash plate, a motor plunger, and a valve. The cylinder block is fixed on the pump shaft, and is formed therein with a pump cylinder hole parallel to the pump shaft, a motor cylinder hole parallel to the pump shaft, and a pair of fluid passages interposed between the pump cylinder hole and the motor cylinder hole. The pump plunger is fitted into the pump cylinder. The movable swash plate is pressed against the pump plunger. The motor plunger is fitted into the motor cylinder hole. A swash plate is provided on the motor shaft member and is pressed against the motor plunger. The valve is disposed in the cylinder block. The valve changes a flow of fluid in the pair of fluid passages according to tilting movement of the movable swash plate so as to change the rotary speed of the motor shaft member.

This HST is minimized in the radial direction thereof centered on the axis of the pump shaft because the movable swash plate, the cylinder block and the motor shaft member, constituting the hydraulic pump and motor, are all disposed around the pump shaft so as be centered on the axis of the pump shaft. Further, this HST is also minimized in the axial direction of the pump shaft because the common cylinder block having the pump and motor plungers therein constitute both the hydraulic pump and motor, whereby the motor shaft whose axial ends define the most distal ends of the HST can be shortened so as to minimize the entire transmission in the axial direction of the pump shaft.

Preferably, the casing is adapted to be directly attached to an engine serving as the drive source. Therefore, when the engine is mounted onto a vehicle body via a vibration isolating member, the effect of the vibration isolating member is also applied to the transmission whose casing is directly attached to the engine, thereby reducing costs because then there is no need for an additional vibration isolating member for vibration-isolatingly supporting the transmission. Further, the engine and the transmission can be assembled together as a single apparatus, which reduces the process for attachment or detachment of the transmission to the engine.

Preferably, the casing includes a first portion and a second portion. The first portion incorporates a drive train interposed between the motor shaft member and the reverser. The second portion incorporates the reverser and the output element. The first portion expands more distally in the axial direction of the pump shaft than the second portion so as to form a step between an outer surface of the first portion and an outer surface of the second portion. An outer end of the output element is disposed on the outer surface of the second portion. Therefore, the outer end of the output element can be disposed inward from the outer surface of the first portion of the casing, thereby facilitating its protection, and thereby axially overlapping the first portion with a transmission member, such as a propeller shaft, to be connected to the outer end of the output element. In other words, a dead space defined by the step is used for arrangement of this transmission member.

Therefore, in a vehicle, a space for the arrangement of the transmission member can be reduced in the axial direction of the pump shaft.

Further preferably, the transmission further comprises an input element supported by the casing so as to be drivingly connected to the drive source and to drive the pump shaft. An outer end of the input element is disposed on an outer end of the casing opposite to the outer surface of the second portion of the casing in the axial direction of the pump shaft. Therefore, the transmission member connected to the outer end of the output element and the drive source connected to the outer end portion of the input element can be arranged without interference with each other. Incidentally, an input shaft interlocking with the pump shaft via gears in the casing typically serves as the input element. Besides, in case that a tip of the pump shaft projects outward from the casing, a spline coupling or a universal joint may be provided on the tip of the pump shaft so as to serve as the input element. The same thing is adapted to hereinafter-mentioned input elements.

Further preferably, a charge pump is disposed on the outer surface of the second portion of the casing so as to be juxtaposed with the outer end of the output element. Therefore, the charge pump which must be externally attached to the casing of the transmission is disposed in the dead space defined by the step, thereby requiring no other space for arranging the charge pump, and thereby further compacting a layout of a vehicle power transmission system.

Preferably, the transmission further comprises an input element supported by the casing so as to be drivingly connected to the drive source and to drive the pump shaft. The input element, the pump shaft having the motor shaft member therearound, a rotary shaft constituting the reverser, and the output element are aligned on a spiral line centered on the input element when viewed in the axial direction of the pump shaft. Therefore, these elements and members are concentrated around the input element so as to compact the entire transmission while ensuring their good efficiency in power transmission. Further, these elements and members can be arranged around the input element to keep a good balance of the transmission.

Preferably, the transmission further comprises a pair of axles and a differential unit. The axles are extended in the axial direction of the pump shaft and are supported by the casing. The differential unit is disposed in the casing so as to transmit power outputted from the forward/backward traveling direction selecting unit to the axles. The differential unit includes a pair of differential yoke shafts, serving as the output element, extended in the axial direction of the pump shaft so as to be drivingly connected to the respective axles. The differential unit is entirely disposed between the axial ends of the pump shaft in the axial direction of the pump shaft. Therefore, the transmission can be provided as a transaxle supporting the pair of axles. The axial compactness of the differential unit minimizes the width of a vehicle between right and left wheels.

Further preferably, a pair of planetary gear units are disposed in the casing so as to be interposed between the respective differential yoke shafts of the differential unit and the respective axles. At least a part of each of the planetary gear units is disposed between the axial ends of the pump shaft in the axial direction of the pump shaft. Therefore, the planetary gear units can ensure a large speed-reduction ratio while they are disposed in the limited space between the axles, thereby requiring no additional gears for speed-reduction on the power train including the reverser and the differential unit.

These, and other objects, features, and advantages will appear more fully from the following description with reference to the accompanying drawings.

DETAILED DESCRIPTION OF THE INVENTION

Figure 1:
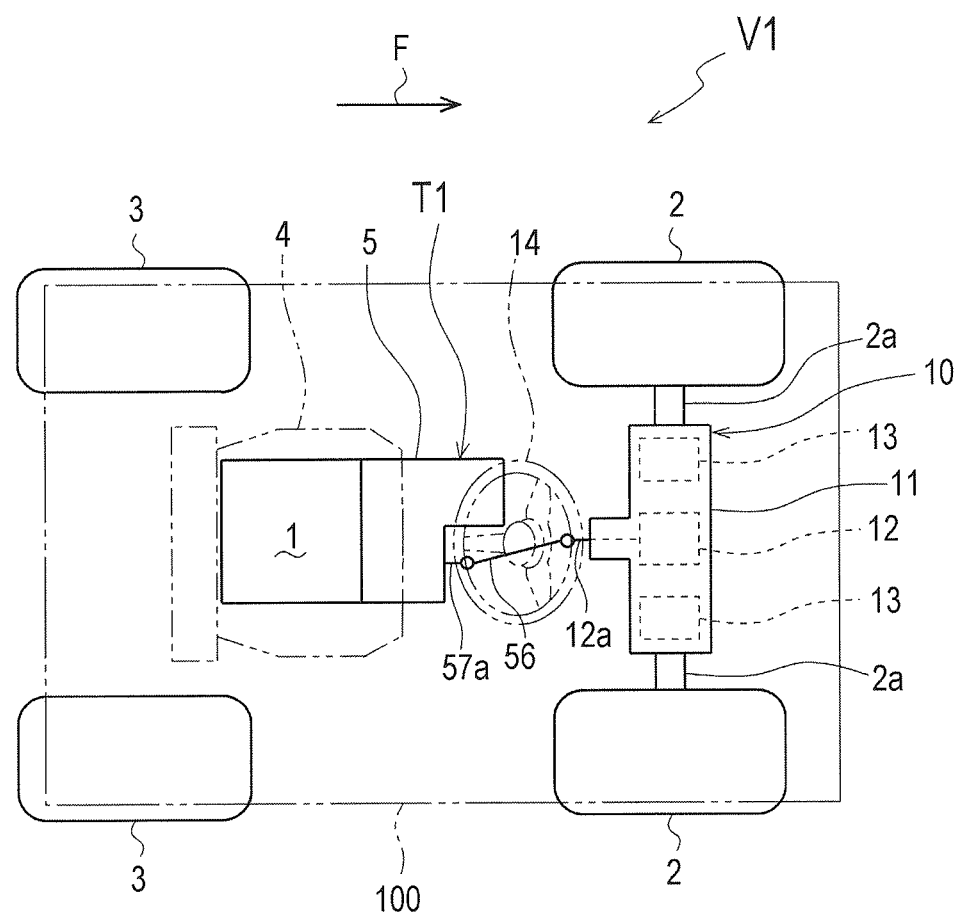
FIG. 1 is a schematic plan view of a vehicle V1 equipped with an integral transmission T1.

Various transmissions and various vehicles or vehicle-driving power transmission system equipped with the respective transmissions will be described with reference to the accompanying drawings. Hereinafter descriptions regarding directions are based on an assumption that arrows F shown in the drawings are directed forward.

An embodiment shown in FIGS. 1 to 8 will be described. A vehicle V1 shown in FIG. 1 is a small-sized work vehicle such as a forklift or a utility vehicle. Vehicle V1 has a vehicle body 100, which is provided at a front portion thereof with right and left front wheels 2 serving as drive wheels, and at a rear portion thereof with laterally turnable right and left rear wheels 3 serving as steerable wheels. An engine 1 serving as a prime mover for driving a transmission T1 is mounted onto a lateral middle portion of vehicle body 100 in front of rear wheels 3 via vibration-isolating members 101 (see FIG. 2), such as rubbers. A casing 5 of integral transmission T1 is directly attached at a rear end thereof to a front surface of engine 1.

A driver's seat 4 is mounted onto vehicle body 100 above engine 1 and transmission T1, and a steering wheel 14 serving as a steering operation device is supported by vehicle body 100 in front of driver's seat 4. A transaxle 10 is supported by vehicle body 100 between right and left front wheels 2 in front of transmission T1. When a driver rotates steering wheel 14, right and left rear wheels 3 are turned rightward or leftward so that vehicle V1 turns right or left.

Figure 2:
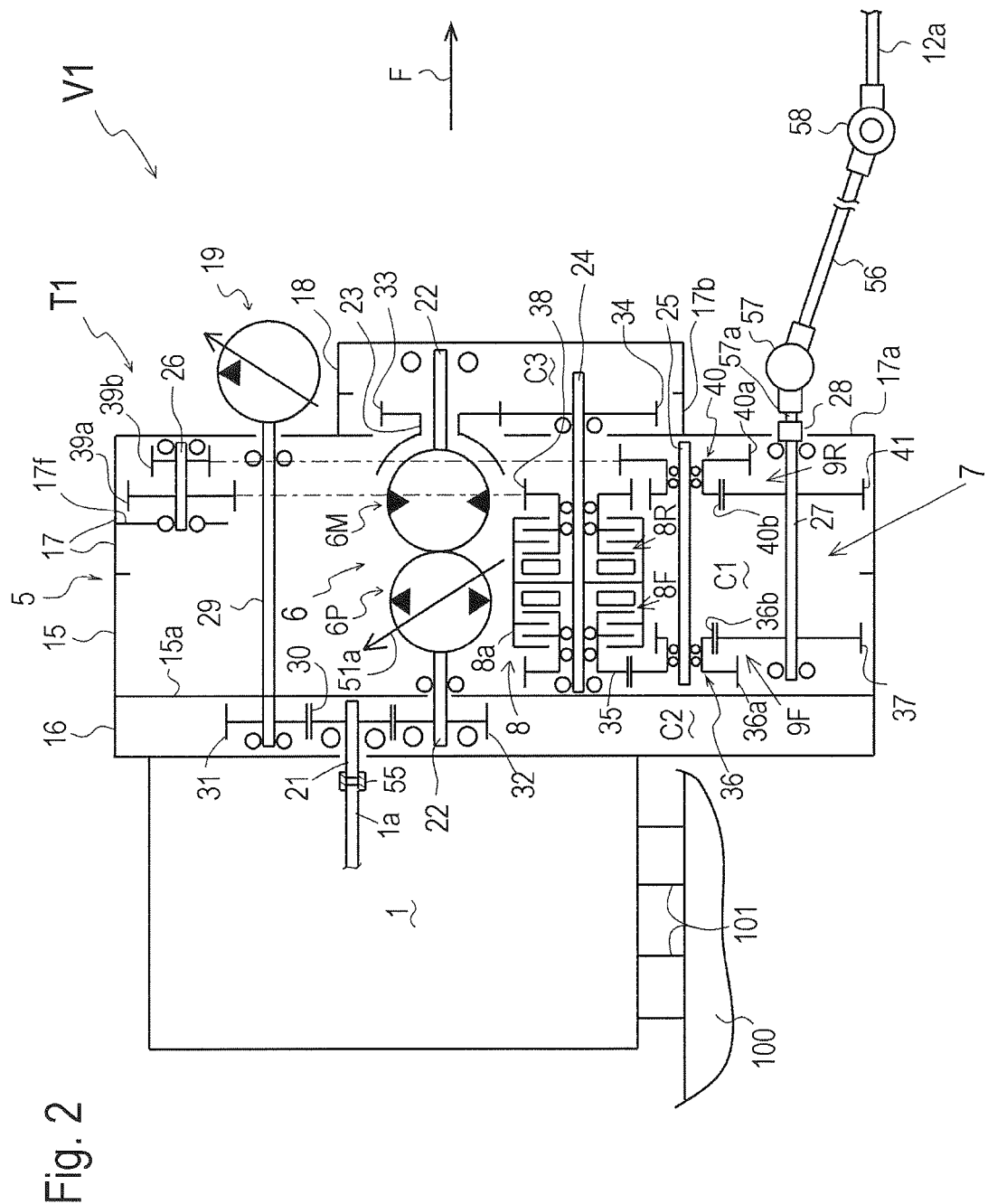
FIG. 2 is a skeleton diagram as a schematic developed plan view of transmission T1.

As shown in FIG. 2 and others, transmission T1 includes a later-discussed hydrostatic stepless transmission unit (hereinafter, referred to as "HST") 6 and a later-discussed forward/backward traveling direction selecting unit (hereinafter, referred to as "reverser") 7. Casing 5 of transmission T1 incorporates HST 6 and reverser 7. HST 6 is driven by engine 1, and reverser 7 is driven by HST 6. As shown in FIG. 1, transaxle 10 has a casing 11, which incorporates a differential unit 12 and a pair of planetary gear units 13. Each of planetary gear units 13 is interposed between differential unit 12 and each of axles 2a serving as center axial shafts of respective front wheels 2 so as to serve as a speed reduction unit.

Figure 3:
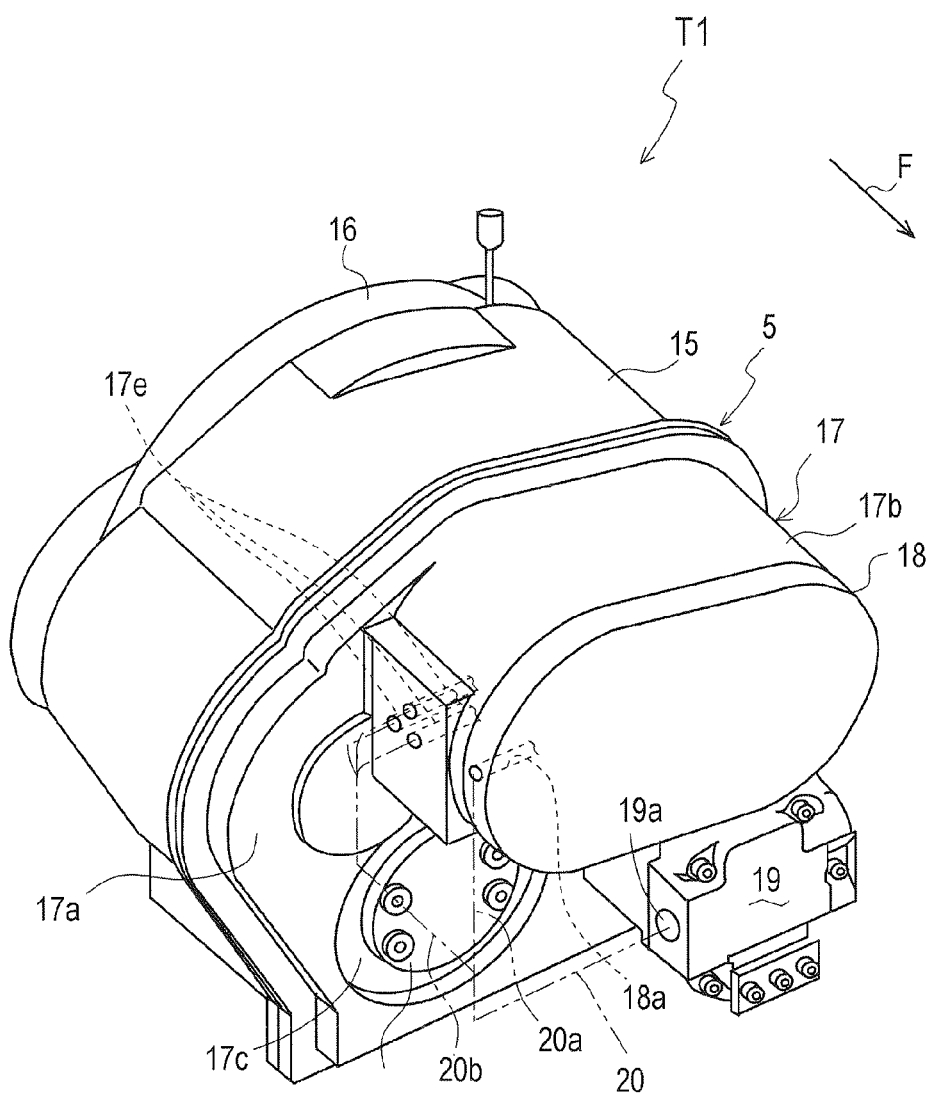
FIG. 3 is a perspective view of transmission T1.
Figure 4:
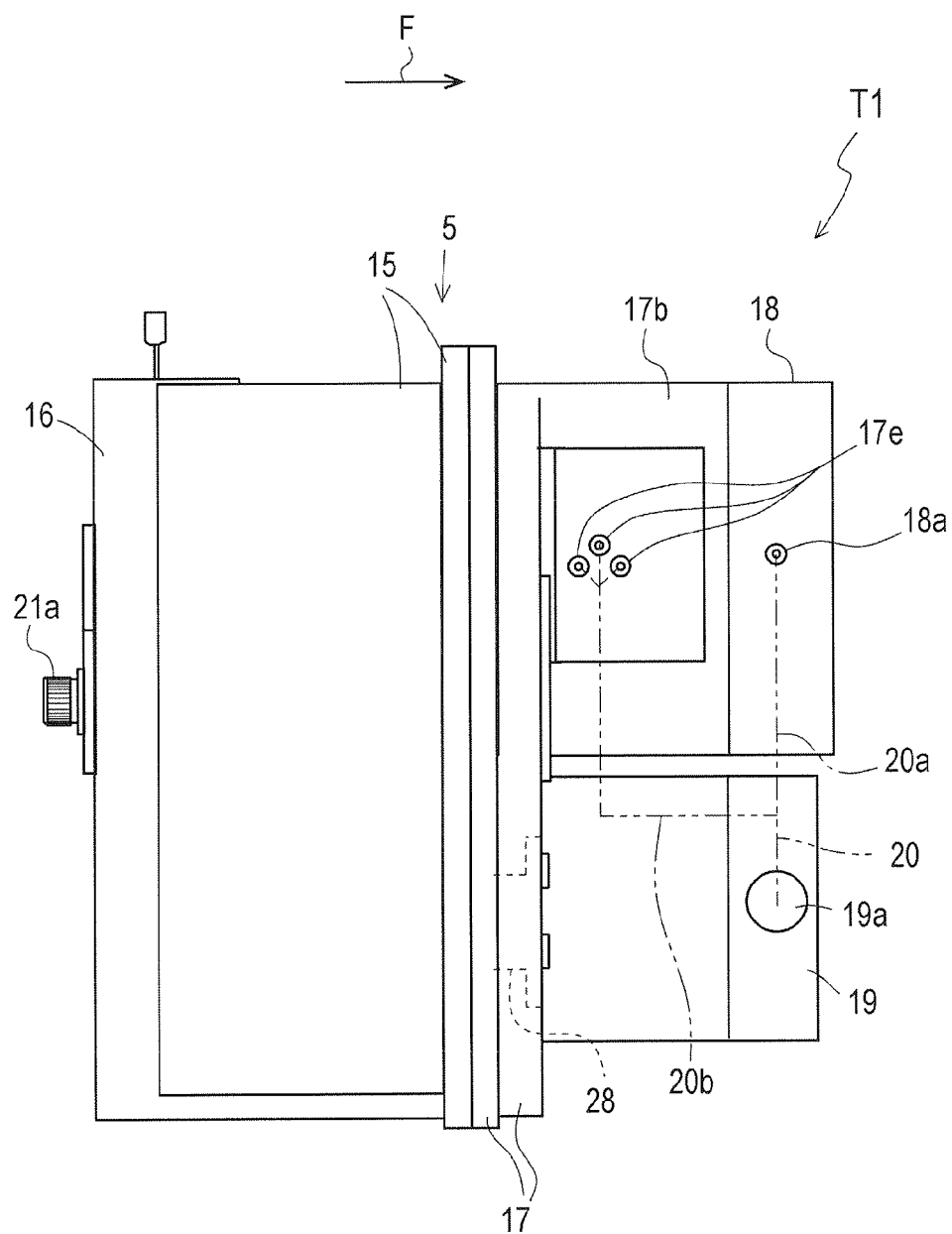
FIG. 4 is a side view of transmission T1.

As shown in FIG. 2 and others, an output shaft 27 serving as an output element of transmission T1 is supported by casing 5 so as to have a horizontal axis extended in the fore-and-aft direction of vehicle V1. As shown in FIGS. 2 to 4, a flange 28 serving as a connection member is fixed onto a front end of output shaft 27 and is exposed forward from casing 5. On the other hand, as shown in FIG. 1, an input shaft 12a of differential unit 12 projects rearward from casing 11 of transaxle 10. As shown in FIGS. 1 and 2, a connection shaft 57a extended from a universal joint 57 is fixed at a rear end thereof to flange 28 coaxially to output shaft 27. On the other hand, input shaft 12a of differential unit 12 is connected at a rear end thereof to universal joint 57 via a universal joint 58 and a propeller shaft 56. Therefore, an output power of transmission T1 is transmitted to right and left front wheels 2 via transaxle 10, i.e., differential unit 12 and right and left planetary gear units 13.

Figure 6:
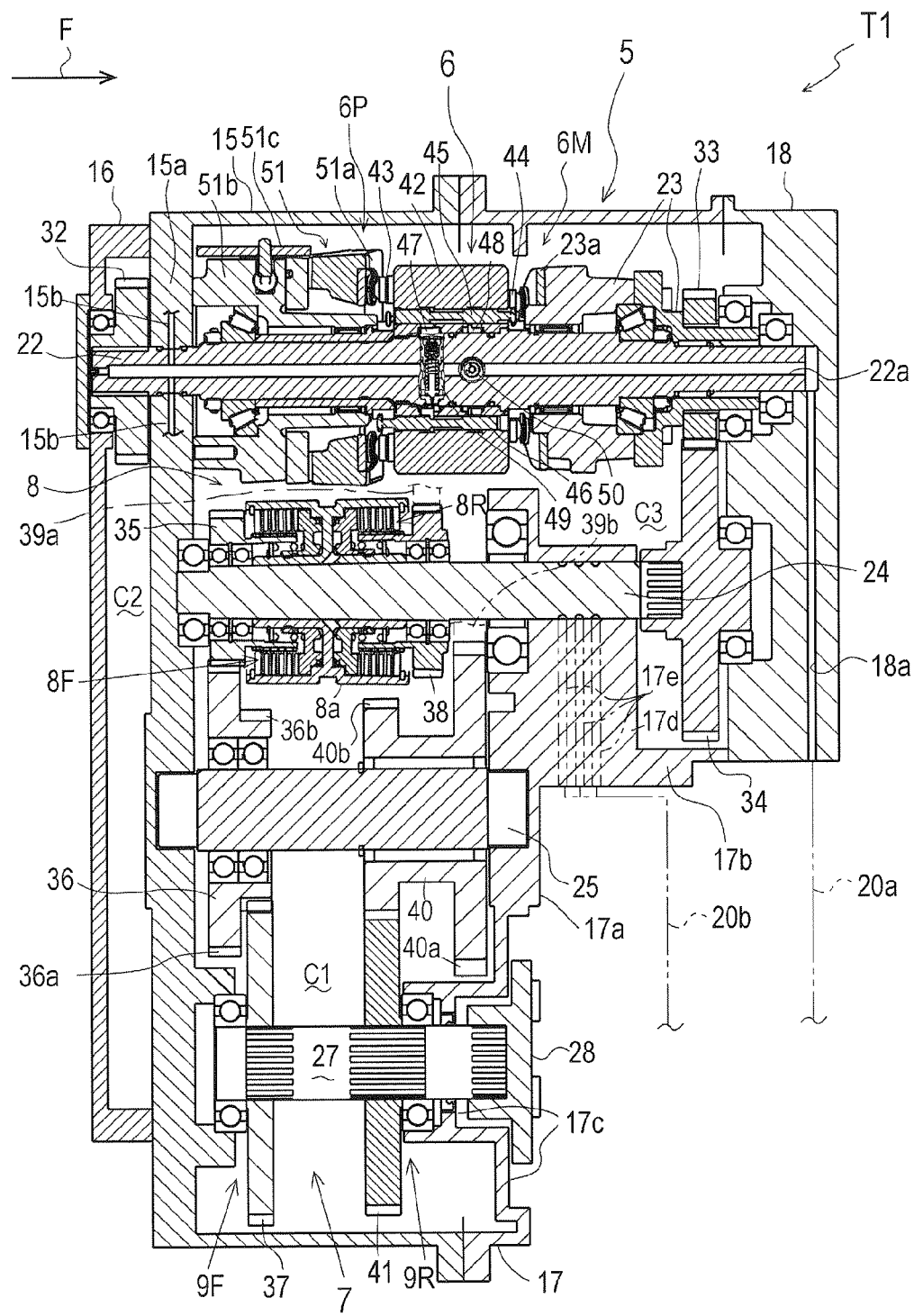
FIG. 6 is a developed sectional view of transmission T1 taken along VI-VI arrowed line of FIG. 5.
Figure 7:
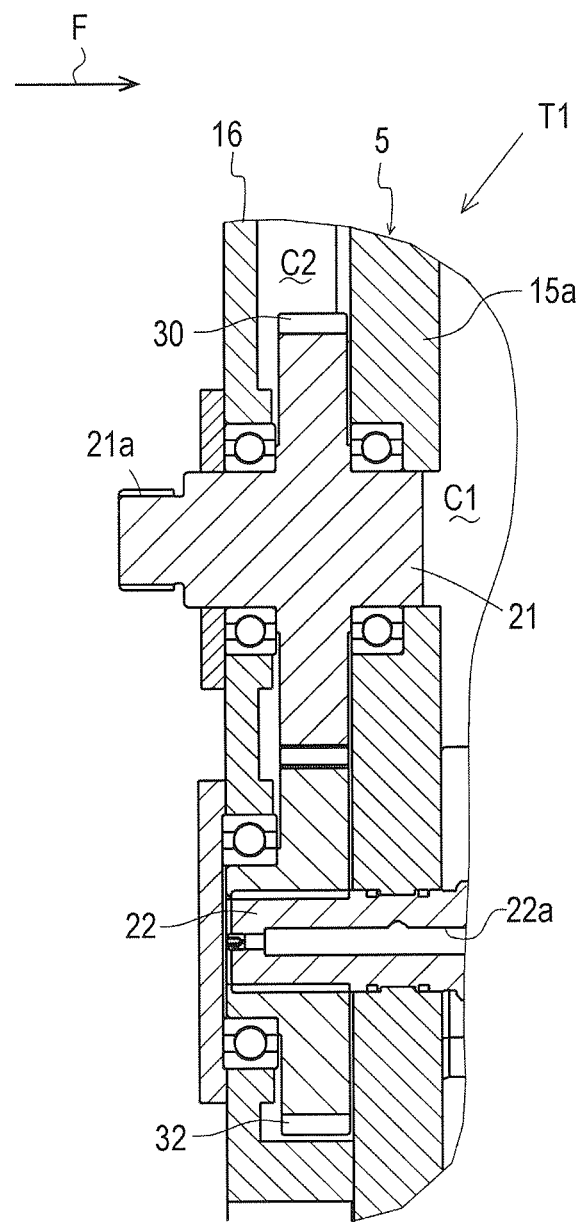
FIG. 7 is a fragmental sectional view of transmission T1 showing gears interposed between an input shaft 21 and a pump shaft 22.

Transmission T1 will be described. Casing 5 of transmission T1 includes a main casing member 15, a rear casing member 16, a front casing member 17 and a front cover 18, which are joined together to constitute casing 5. Main casing member 15 has an outer peripheral surface extended in the fore-and-aft direction of vehicle V1, and is opened at a front end thereof. As shown in FIGS. 2, 6, 7 and others, main casing member 15 is closed at a rear end thereof so as to form a vertical rear wall 15a. Rear casing member 16 is joined at a front end thereof to a rear end surface of rear wall 15a of main casing member 15. Front casing member 17 is joined at a rear end thereof to the front end of main casing member 15 so as to cover the opening at the front end of main casing member 15. Front casing member 17 has a vertical front wall 17a and is formed with an expanded portion 17b which is expanded forward from a top portion of front wall 17a. Front cover 18 is joined at a rear end thereof to a front end of expanded portion 17b so as to cover an opening at the front end of expanded portion 17b.

A main chamber C1 is formed in main casing member 15 and front casing member 17 between rear wall 15a of main casing member 15 and front wall 17a of front casing member 17. An input gear chamber C2 is formed in rear casing member 16 between rear wall 15a of main casing member 15 and the vertical rear end wall of rear casing member 16. An intermediate gear chamber C3 is formed in expanded portion 17b of front casing member 17 between front wall 17a of front casing member 17 and the vertical front end wall of front cover 18. In this way, casing 5 is formed therein with main chamber C1, with input gear chamber C2 rearward from main chamber C1, and with intermediate gear chamber C3 forward from main chamber C2. Further, expanded portion 17b of front casing member 17 and front cover 18 define a step between a front surface of front cover 18 and a front surface of front wall 17a of main casing member 17 so as to ensure a space below intermediate gear chamber C3 and in front of the front surface of front wall 17a. This space is used for arranging a charge pump 19, flange 28, and connection shaft 57a connected to flange 28, as discussed later.

Transmission T1 includes rotary shafts 21, 22, 23, 24, 25, 26, 27 and 29 pivoted in casing 5. All of these rotary shafts have horizontal axes extended in the fore-and-aft direction of vehicle V1 and are extended parallel to each other, while shafts 22 and 23 are coaxial to each other as later discussed.

As shown in FIGS. 2, 4 and 7, input shaft 21 serves as an input shaft (input element) of transaxle T1. As shown in FIGS. 4 and 7, input shaft 21 has a splined rear end 21a which projects rearward from the rear end of casing 5, i.e., the rear end wall of rear casing member 16. Engine 1 has an engine output shaft (crankshaft) 1a whose front end is splined. As shown in FIG. 2, a coupling sleeve 55 is splined on an inner peripheral surface thereof. Rear end 21a of input shaft 21 and the front end of engine output shaft 1a are spline-fitted into coupling sleeve 55 so that input shaft 21 and engine output shaft 1a are connected to be unrotatable relative to each other and are extended coaxially to each other. Alternatively, engine output shaft 1a may be formed at a front end thereof with a splined hole into which rear end 21a of input shaft 21 is spline-fitted.

As shown in FIGS. 2, 6 and 7, pump shaft 22 serves as an input shaft of HST 6. Pump shaft 22 is journalled at a rear end thereof by the vertical rear end wall of rear casing member 16 via a bearing, and is journalled at a front end thereof by front cover 18 via a bearing. In this way, front and rear ends of pump shaft 22 substantially define foremost and rearmost ends of transmission T1. Motor shaft member 23 serves as an output shaft member of HST 6. Motor shaft member 23 is a hollow (cylindrical) shaft fitted on pump shaft 22 so as to be rotatable relative to pump shaft 22.

As shown in FIGS. 2 and 6, clutch shaft 24 is journalled at a rear end thereof by rear wall 15a of main casing member 15 via a bearing. Clutch shaft 24 is disposed at a front end thereof in intermediate gear chamber C3. A later-discussed gear 34 is fixed on the front end of clutch shaft 24 via a bearing. As shown in FIG. 6, a front end of gear 34 is disposed rearward from the front end of pump shaft 22 so as to ensure a space forward therefrom for forming later-discussed fluid passages 18a in front cover 18.

As shown in FIGS. 2 and 6, counter shaft 25 constitutes a forward traveling gear train 9F and a backward traveling gear train 9R as discussed later. Counter shaft 25 is fitted and supported at a rear end thereof in rear wall 15a of main casing member 15, and at a front end thereof in front wall 17a of front casing member 17. As shown in FIG. 2, idle shaft 26 serves as another counter shaft constituting backward traveling gear train 9R. Idle shaft 26 is journalled at a rear end thereof via a bearing by a bearing wall 17f formed in front casing member 17, and is journalled at a front end thereof via a bearing by front wall 17a of front casing member 17.

As shown in FIGS. 2 and 6, output shaft 27, serving as the output shaft of transmission T1 as mentioned above, is journalled at a rear end thereof by rear wall 15a of main casing member 15 via a bearing. Front casing member 17 is formed with a recess 17c extended rearward from front wall 17a.

Output shaft 27 is journalled at a front portion via a bearing by front casing member 17 immediately rearward of recess 17c. As shown in FIGS. 3 and 6, output shaft 27 projects at the front end thereof forward into recess 17c, and flange 28 is fixed on the front end of output shaft 27 in recess 17c so as to have a vertical front end surface which is substantially disposed on a vertical plane on which the front surface of front wall 17a below expanded portion 17b of front casing member 17. In this way, output shaft 27 is disposed so as to be lower than input shaft 21 and to be laterally eccentric in transmission T1.

As shown in FIG. 2, change pump shaft 29 has a front end which is disposed below expanded portion 17b of front casing member 17 and laterally opposite to flange 28. The front end of charge pump shaft 29 projects forward from front wall 17a of front casing member 17 so as to be provided thereon with charge pump 19 for supplying fluid serving as hydraulic fluid to HST 6 and a later-discussed reverser clutch 8 and serving as lubricating fluid. In this way, expanded portion 17b cantilevers forward so as to have a space therebelow, and in this space, flange 28 on the front end of output shaft 27 and charge pump 19 on the front end of charge pump shaft 29 are juxtaposed right and left, thereby vertically minimizing transmission T1.

Figure 5:
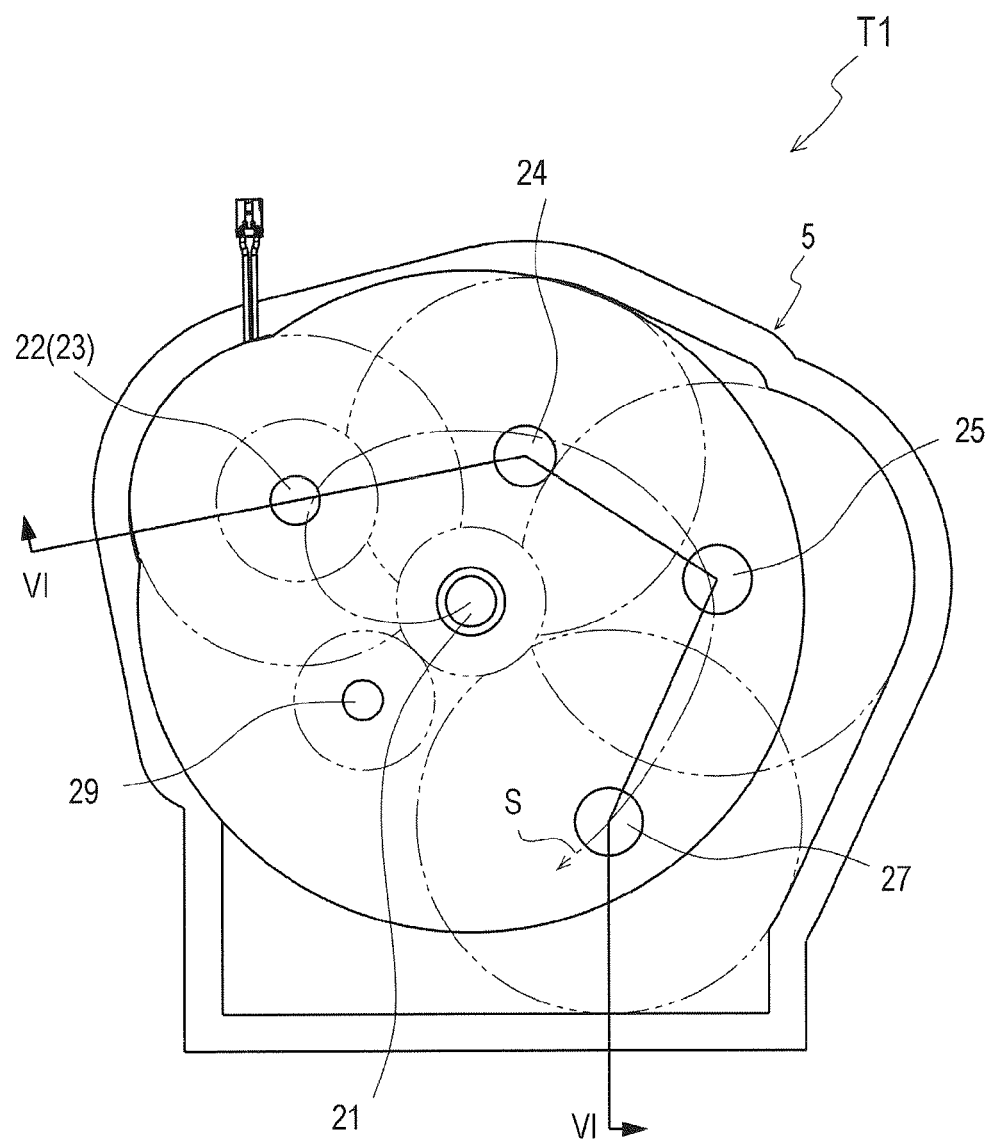
FIG. 5 is a schematic front view of transmission T1.

As shown in FIG. 5, when viewed in front (in the axial direction of transmission T1), input shaft 21 is disposed at the lateral and vertical center of transmission T1, output shaft 27 is disposed laterally downward from input shaft 21, and shafts 22(23), 24 and 25 for transmitting rotation of input shaft 21 to output shaft 27 are aligned so as to laterally round above input shaft 21, so that axes of shafts 21, 22(23), 24, 25 and 27 are aligned on a spiral line S centered on the axis of input shaft 21. Therefore, these shafts and members around the respective shafts, such as gears, a cylinder block and a clutch constituting HST 6 and reverser 7 are aligned so as to be vertically and laterally compact, thereby ensuring the vertical and lateral compactness of transmission T1.

Incidentally, charge pump shaft 29, and gear 31 and charge pump 19 on charge pump shaft 29 are disposed so as not to spoil the compact arrangement of shafts 21, 22(23), 24, 25 and 27 and the members around these shafts as shown in FIG. 5. Idle shaft 26 and gears 39a and 39b on idle shaft 26 are not shown in FIG. 5, however, these are arranged in the same way.

HST 6 configures a hydraulic pump 6P and a hydraulic motor 6M which are aligned rear and front around pump shaft 22. In main chamber C1, a cylinder block 42 constituting hydraulic pump 6P and motor 6M is provided therein with later-discussed plungers 43 and 44 and the like, and a later-discussed pump swash plate assembly 51 are provided so as to constitute hydraulic pump 6P. In this regard, as shown in FIG. 6, pump shaft 22 is passed through rear wall 15a rearward from main chamber C1, and is further passed through input gear chamber C2 rearward from rear wall 15a, so that the rear end of pump shaft 22 is journalled by the rear end wall of rear casing member 16 via a bearing. Therefore, the rear end of pump shaft 22 defines the rear end of HST 6.

On the other hand, motor shaft member 23 serves as a motor swash plate assembly of hydraulic motor 6M and is disposed around pump shaft 22 across main chamber C1 and intermediate gear chamber C3. A front end of motor shaft member 23 is disposed rearward from the front end of pump shaft 22 in front cover 18 (in front of intermediate gear chamber C3). As a result, the front end of pump shaft 22 defines the front end of HST 6.

Reverser 7, disposed at the downstream of pump shaft 22, includes shafts 24, 25, 26 and 27, gears around these respective shafts and a reverser clutch 8 disposed on clutch shaft 24.

Reverser 7 is entirely disposed in main chamber C1 excluding gear 34 on the front end of clutch shaft 24 in intermediate gear chamber C3. None of shafts 24, 25, 26 and 27 projects rearward from rear wall 15a into input gear chamber C2. Further, the front end of gear 34 is disposed rearward from the front end of pump shaft 22 as mentioned above.

In this way, in the fore-and-aft direction of transmission T1, i.e., in the axial direction of pump shaft 22 of HST 6 and of shafts 24, 25, 26 and 27 of reverser 7, all the components of reverser 7, including shafts 24, 25, 26 and 27 parallel to pump shaft 22, are disposed in the length of HST 6 between the front and rear ends of HST 6, i.e., between the front and rear ends of pump shaft 22. In other words, reverser 7 has no part projecting forward or rearward from HST 6, thereby ensuring the compactness of transmission T1 in the fore-and-aft direction.

As shown in FIGS. 2 and 7, in input gear chamber C2, a gear 30 is fixed on input shaft 21. In this embodiment, actually, gear 30 is integrally formed on input shaft 21. Hereinafter, it is assumed that, when a gear is described as being "fixed" on a shaft, the gear may be integrally formed on the shaft, similarly to gear 30.

In input gear chamber C2, gear 30 meshes with both a gear 32 fixed on pump shaft 22 and a gear 31 fixed on charge pump shaft 29. Therefore, the rotational power of input shaft 21 is transmitted to pump shaft 22 and charge pump shaft 29 so that both hydraulic pump 6P of HST 6 and charge pump 19 are simultaneously driven by power of engine 1.

A structure of HST 6 will be described with reference to FIGS. 2, 6 and 8. As shown in FIG. 6, in main chamber C1, a cylinder block 42, which is common to both hydraulic pump 6P and motor 6M, is fixed on a fore-and-aft (axial) intermediate portion of pump shaft 22. A pump swash plate assembly 51 is disposed around pump shaft 22 between a rear end surface of cylinder block 42 and rear wall 15a of main casing member 15. Pump swash plate assembly 51 includes a pump swash plate 51a, a swash plate holder 51b and an arm 51c. Swash plate holder 51b is fixed at a rear end thereof to rear wall 15a, and is penetrated at the center axial portion thereof by pump shaft 22, which is relatively rotatably fitted to swash plate holder 51b via bearings. Pump swash plate 51a is supported on a front end portion of swash plate holder 51b so as to serve as a movable swash plate which is movable to change its tilt angle relative to the axis of pump shaft 22. Arm 51c is operatively connected to pump swash plate 51a and is pivoted on swash plate holder 51b.

On the other hand, in intermediate gear chamber C3, motor shaft member 23 serving as a motor swash plate assembly is disposed around pump shaft 22 between the front end surface of cylinder block 42 and front cover 18. Motor shaft member 23 is a cylindrical member (hollow shaft) whose center axis portion is penetrated by pump shaft 22, which is relatively rotatably fitted to motor shaft member 23 via bearings. Further, motor shaft member 23 is journalled at a front end portion thereof by front cover 18 via a bearing. Motor shaft member 23 is configured so as to have a motor swash plate 23a at a rear end thereof. Motor swash plate 23a serves as a fixed swash plate having a constant tilt angle relative to the axis of pump shaft 22.

Cylinder block 42 is formed therein with cylinder holes, which are aligned as a perimeter centered on the axis of pump shaft 22 when viewed in the axial (fore-and-aft) direction of pump shaft 22. As shown in FIG. 6, pump plungers 43 and motor plungers 44 are fitted into the respective cylinder holes so as to be reciprocally slidable parallel to the axis of pump shaft 22. Pump plungers 43 and motor plungers 44 are alternately aligned so as to surround pump shaft 22 when viewed in the axial (fore-and-aft) direction of pump shaft 22. Heads (front ends) of motor plungers 44 project forward from the front end surface of cylinder block 42 so as to be pressed against motor swash plate 23a. Heads (rear ends) of pump plungers 43 project rearward from the rear end surface of cylinder block 42 so as to be pressed against pump swash plate 51a.

Further, cylinder block 42 is formed therein with valve holes. When viewed in the axial (fore-and-aft) direction of pump shaft 22, the valve holes are aligned as a perimeter centered on the axis of pump shaft 22, and each of the valve holes is disposed between pump shaft 22 and each of the cylinder holes. As shown in FIG. 6, first spools 45 and second spools 46 are fitted into the respective valve holes so as to be reciprocally slidable along the axis of pump shaft 22. In cylinder block 42, the valve holes having first spools 45 therein are connected to the respective pump cylinder holes having pump plungers 43 therein, and the valve holes having second spools 46 therein are connected to the respective motor cylinder holes having motor plungers 44 therein. Rear end portions of first spools 45 project rearward from the rear end surface of cylinder block 42 so as to engage with a cam fitted on pump shaft 22 between pump swash plate 51a and cylinder block 42. Front end portions of second spools 46 project forward from the front end surface of cylinder block 42 so as to engage with a cam fitted on pump shaft 22 between motor swash plate 23a and cylinder block 42.

In this way, cylinder block 42, pump plungers 43 and pump swash plate assembly 51 constitute hydraulic pump 6P. Cylinder block 42, motor plungers 44, and motor shaft member (motor swash plate assembly) 23 constitute hydraulic motor 6M.

Figure 8:
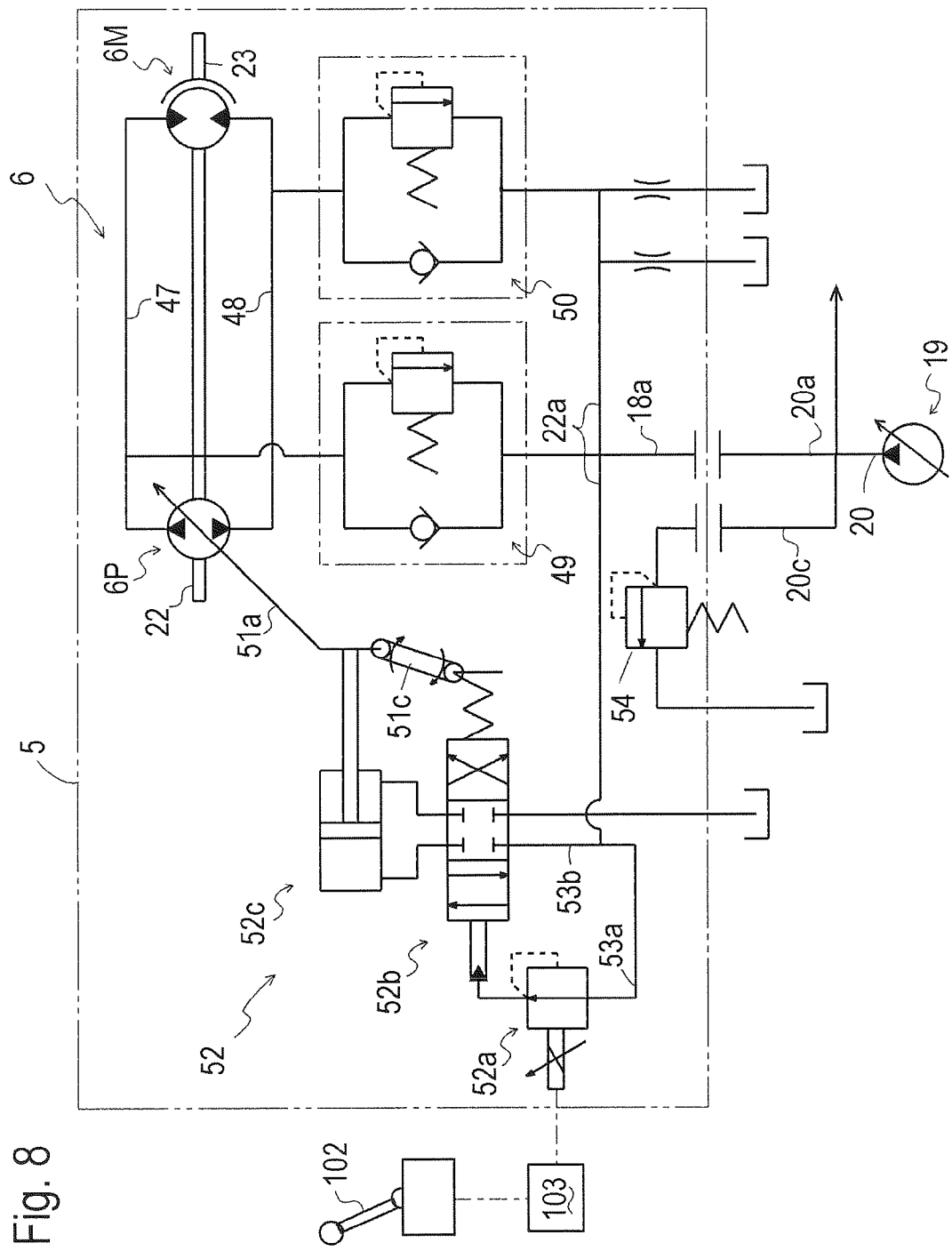
FIG. 8 is an HST circuit diagram for transmission T1.

As shown in FIG. 8, hydraulic pump 6P and hydraulic motor 6M are fluidly connected to each other via a pair of fluid passages 47 and 48 so as to constitute a closed fluid circuit of HST 6. Fluid passages 47 and 48 are formed in cylinder block 42 so as to be connected to all the valve holes and to each other on an outer peripheral surface of pump shaft 22. When pump swash plate 51a is disposed at its neutral position, i.e., when a tilt angle of pump swash plate 51a relative to the axis of pump shaft 22, i.e., a pump swash plate angle, is zero, hydraulic pressures in respective fluid passages 47 and 48 are equal to each other. In this state, the reciprocal movement speed of motor plungers 44 is equal to the reciprocal movement speed of pump plungers 43, so that motor shaft member 23 rotates at the same speed as that of pump shaft 22 and cylinder block 42. When pump swash plate 51a is tilted to one side from the neutral position, one of fluid passages 47 and 48 becomes the higher-pressurized fluid passage so as to increase the reciprocal movement speed of motor plungers 44, whereby motor shaft member 23 rotates faster than pump shaft 22 and cylinder block 42. When motor swash plate 51a is tilted to the opposite side from the neutral position, the other of fluid passages 47 and 48 becomes the higher-pressurized fluid passage so as to reduce the reciprocal movement speed of motor plungers 44, whereby motor shaft member 23 rotates slower than pump shaft 22 and cylinder block 42. Wherever pump swash plate 51a is set, the rotational direction of motor shaft member 23 is constant, i.e., in the same direction as that of pump shaft 22.

As shown in FIG. 8, a hydraulic servomechanism 52 is activated by manipulation of a speed control lever (or pedal) 102 provided in vehicle V1 so as to control the tilt of movable pump swash plate 51a. The stroke of pump plungers 43 is determined based on the tilt angle of pump swash plate 61b so as to determine the slide positions of first and second spools 45 and 46, thereby determining the rotary speed of motor shaft member 23 relative to pump shaft 22. In this way, the output rotary speed of HST 6 is steplessly changed according to operation of speed control lever 102.

Each of later-discussed other HSTs 6 is also configured as mentioned above so as to have coaxial hydraulic pump 6P and motor 6M centered on its pump shaft, i.e., an HST input shaft. Incidentally, each of later-discussed HSTs 6A and 6B serves as HST 6 modified by changing the structure of motor shaft member 23.

As shown in FIGS. 6 and 7, fluid passage 22a is formed in pump shaft 22 along the axis of pump shaft 22. Incidentally, in FIG. 8, fluid passage 22a is drawn as being separated from pump shaft 22 for convenience in illustration, however, it is actually formed in pump shaft 22. In pump shaft 22, a charge valve assembly 49 is fitted to be interposed between fluid passages 22a and 47, and a charge valve assembly 50 is fitted to be interposed between fluid passages 22a and 48. As shown in FIG. 8, each of charge check valve assemblies 49 and 50 includes a charge check valve for allowing only flow of fluid from passage 22a to passage 47 or 48, and includes a relief valve for releasing excessive fluid from passage 47 or 48 to passage 22a.

As shown in FIGS. 3, 4, 6 and 8, a fluid passage 18a is formed in front cover 18 and is connected to fluid passage 22a in pump shaft 22. In the outside of casing 5, a pressurized fluid pipe 20 is extended from a delivery port 19a of charge pump 19 and is split into an HST fluid pipe 20a and a clutch fluid pipe 20b. Pipe 20a is connected to an open end of passage 18a in front cover 18. In this way, pressurized fluid delivered from charge pump 19 is supplied as hydraulic fluid for HST 6 to one of fluid passages 47 and 48 of HST 6 via pipes 20 and 20a, passages 18a and 22a and the charge check valve of one of charge check valve assemblies 49 and 50.

As shown in FIG. 6, fluid passages 15b for servomechanism 52 are formed in rear wall 15a, and fluid passage 22a in pump shaft 22 is also connected to fluid passages 15b. As shown in FIG. 8, servomechanism 52 is disposed in casing 5, and includes a solenoid valve 52a, a spool valve 52b and a hydraulic cylinder 52c. Hydraulic cylinder 52c is provided therein with a piston interlocking with pump swash plate 51a. This piston is controlled by spool valve 52b whose pilot pressure is controlled by solenoid valve 52a. A controller 103 receives an input signal issued based on operation of speed control lever 102, and controls the opening and closing of solenoid valve 52a based on the input signal, thereby controlling spool valve 52b for controlling the position of the piston in hydraulic cylinder 52c interlocking with pump swash plate 51a. Incidentally, spool valve 52b is also connected to pump swash plate 51a via a spring and arm 51c, so that the position of pump swash plate 51a is fed back to spool valve 52b. Fluid passages 15b formed in rear wall 15a serve as fluid passages 53a and 53b shown in FIG. 8. Fluid passage 53a is extended to solenoid valve 52a, and fluid passage 53b to spool valve 52b. Further, a pressure regulating valve 54 shown in FIG. 8 is disposed in casing 5, and in the outside of casing 5, a pressurized fluid pipe 20c is branched from pipe 20 at the upstream side of the branching point of pipe 20 to pipe 20a and is connected to pressure regulating valve 54 so as to regulate the pressure of fluid from charge pump 19 to fluid passage 22a (and to a later-discussed clutch fluid passage 17e).

As shown in FIGS. 2 and 6, in intermediate gear chamber C3, a gear 33 is fixed on motor shaft member 23 and meshes with gear 34 fixed on the front end of clutch shaft 24, thereby transmitting the output power of HST 6 to clutch shaft 24. In main chamber C1, reverser 7 includes shafts 24, 25, 26 and 27, reverser clutch 8 disposed around clutch shaft 24, a forward traveling gear train 9F interposed between clutch shaft 24 and output shaft 27, and a backward traveling gear train 9R interposed between clutch shaft 24 and output shaft 27.

As shown in FIGS. 2 and 6, a gear 35 is fitted on clutch shaft 24 rearward from reverser clutch 8 so as to be rotatable relative to clutch shaft 24. A gear member 36 is formed with a large diameter gear 36a and a small diameter gear 36b, and is fitted on counter shaft 25 via a bearing so as to be rotatable relative to counter shaft 25. A gear 37 is fixed on output shaft 27. Gears 35 and 36a mesh with each other, and gears 36b and 37 mesh with each other, so that gears 35, 36a, 36b and 37 constitute forward traveling gear train 9F. On the other hand, a gear 38 is fitted on clutch shaft 24 forward from reverser clutch 8 so as to be rotatable relative to clutch shaft 24. A gear member 40 is formed with a large diameter gear 40a and a small diameter gear 40b, and is fitted on counter shaft 25 via a bearing so as to be rotatable relative to counter shaft 25. A small diameter gear 39a and a large diameter gear 39b are provided on idle shaft 26 as shown in FIG. 2. A gear 41 is fixed on output shaft 27. Gear 40a meshes with gears 38 and 39a, and gear 40b meshes with gears 39b and 41, so that gears 38, 40a, 39a, 39b, 40b and 41 constitute backward traveling gear train 9R. Similar to gear members 36, 40, a gear member formed integrally with gears 39a and 39b may be provided on idle shaft 26.

As shown in FIG. 6, a clutch drum 8a constituting reverser clutch 8 is fixed on clutch shaft 24. Clutch drum 8a defines front and rear chambers and is formed with a partition between the front and rear chambers. A forward extended portion of gear 35 is inserted into the rear chamber, and friction discs constituting a forward traveling clutch 8F are disposed in the rear chamber so as to be interposed between clutch drum 8a and the forward extended portion of gear 35. A rearward extended portion of gear 38 is inserted into the front chamber, and friction discs constituting a backward traveling clutch 8R are disposed in the front chamber so as to be interposed between clutch drum 8a and the rearward extended portion of gear 38. Each of the front and rear chambers is provided therein with a hydraulic actuator for pressing the friction discs against one another and separating the friction discs from one another. In this way, reverser clutch 8 includes forward traveling clutch 8F and backward traveling clutch 8R, each of which is a multidisc type wet friction clutch.

As shown in FIG. 6, clutch shaft 24 is supported at a front portion thereof by a wall 17d formed on a bottom portion of expanded portion 17b of front casing member 17, and projects at the front end thereof forward from wall 17d so as to be fixedly provided thereon with gear 34 as mentioned above. Further, clutch shaft 24 is formed therein with a hydraulic pressurized fluid passage for forward traveling clutch 8F, a hydraulic pressurized fluid passage for backward traveling clutch 8R and a lubricating fluid passage, which are connected to respective fluid passages 17e formed in wall 17d. These passages 17e are connected to respective clutch fluid pipes 20b extended in the outside of casing 5. Pipes 20b are combined with HST fluid pipe 20a into pipe 20 connected to delivery port 19a of charge pump 19. Therefore, charge pump 19 supplies hydraulic pressurized fluid to hydraulic pump 6P and motor 6M of HST 6, and simultaneously supplies hydraulic pressurized fluid and lubricating fluid to forward traveling clutch 8F and backward traveling clutch 8R in reverser clutch 8 of reverser 7.

A vehicle V2 shown in FIG. 9 will be described. Vehicle V2 includes vehicle body 100, right and left front wheels 2, right and left rear wheels 3, engine 1, driver's seat 4 and steering wheel 14, similar to vehicle V1. An integral transmission T2 including a casing 61 is disposed between right and left front wheels 2. Right and left front wheels 2 have respective axles 2a journalled by respective right and left end portions of casing 61 via respective bearings. Transmission T2 is disposed in vehicle V2 distantly from engine 1, and serves as a transaxle corresponding to integral combination of transmission T1 and transaxle 10, which are provided separately in vehicle V1.

Figure 10:
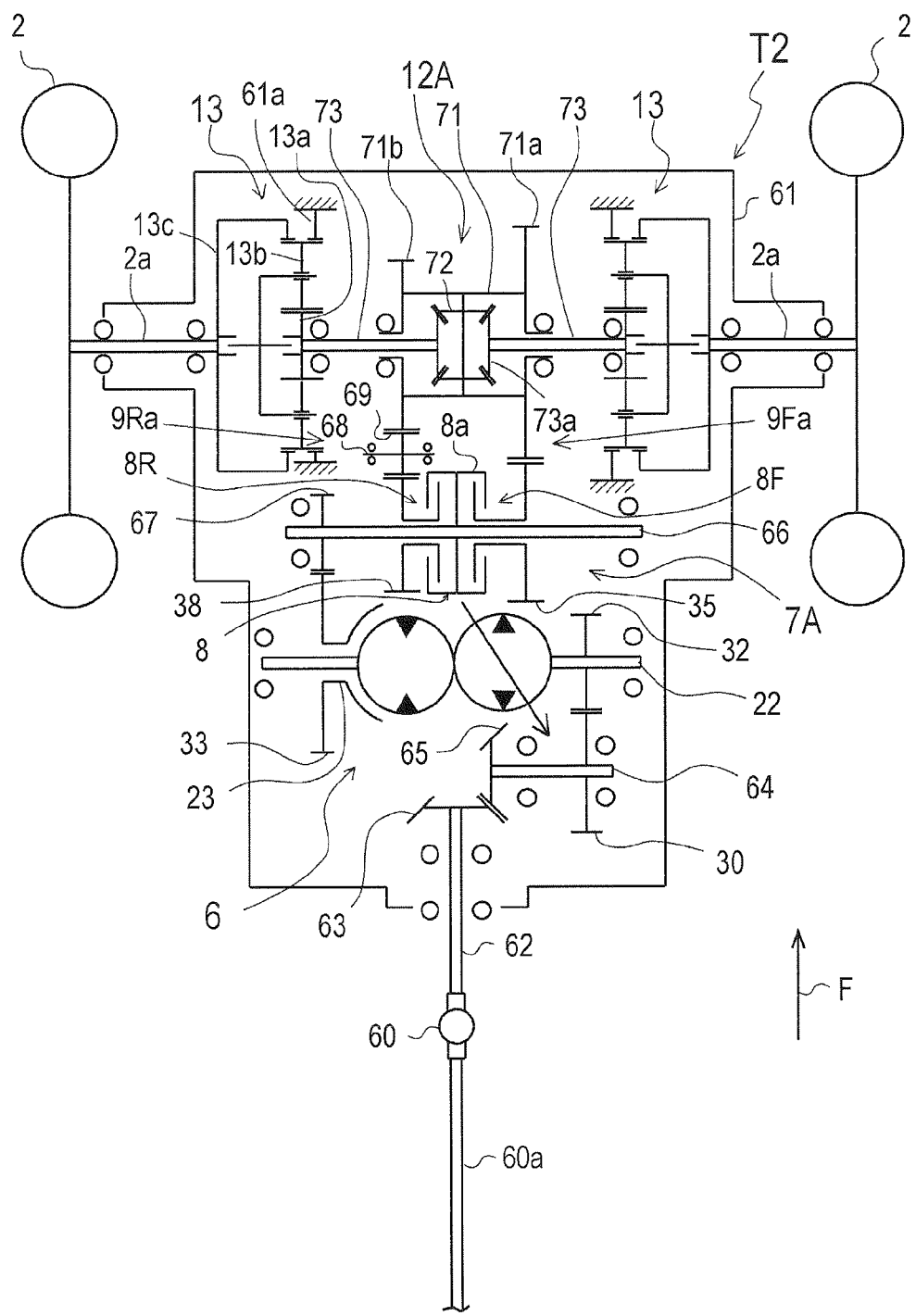
FIG. 10 is a skeleton diagram as a schematic developed plan view of transmission T2.
Figure 11:
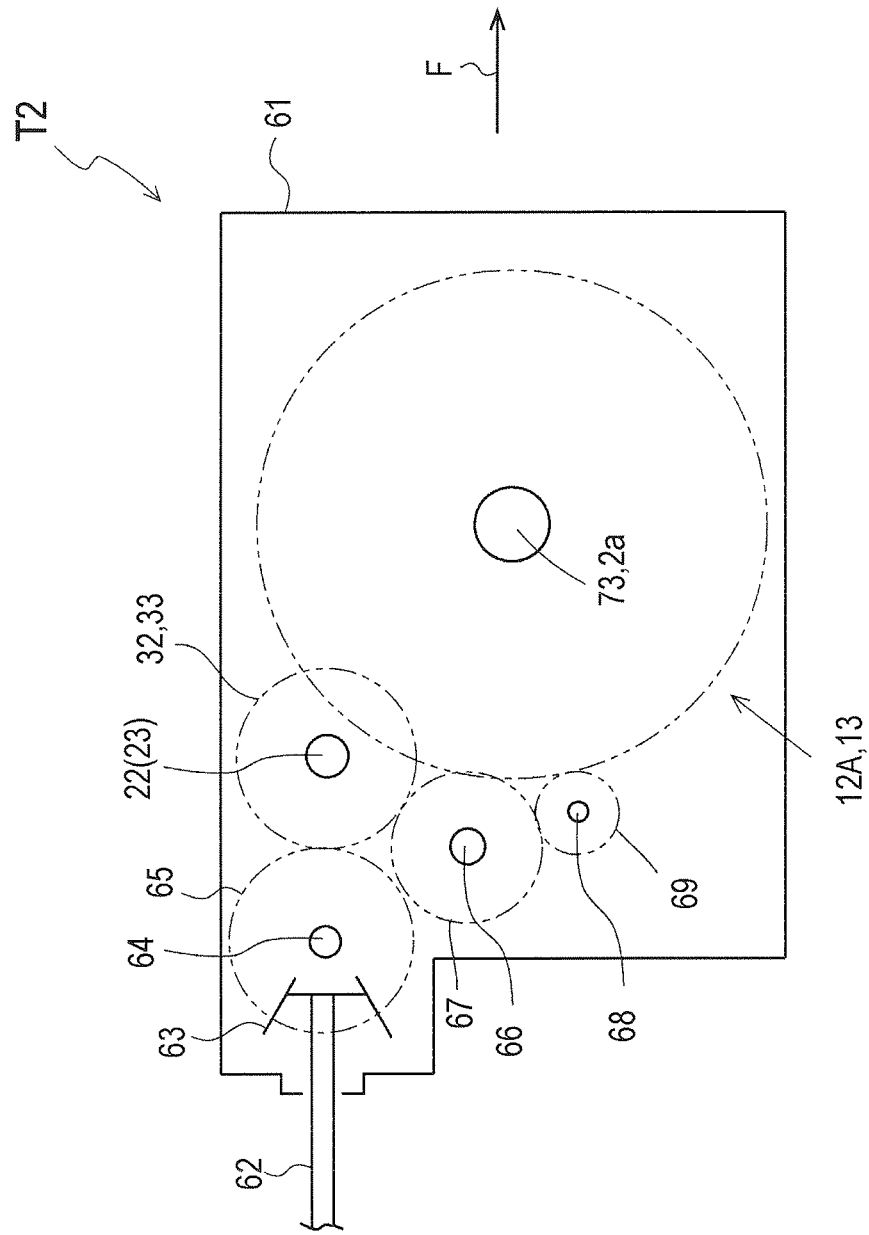
FIG. 11 is a schematic side view of transmission T2.

As shown in FIGS. 10 and 11, an input shaft 62, a counter shaft 64, pump shaft 22, a clutch shaft 66, idling (backward traveling counter) shaft 68 and a pair of right and left differential yoke shafts 73 are journalled in casing 61 of transmission T2. Input shaft 62 has a horizontal axis extended in the fore-and-aft direction of vehicle V2 perpendicular to axles 2a. Counter shaft 64, pump shaft 22, clutch shaft 66, idle shaft 68 and right and left differential yoke shafts 73 have respective horizontal axes extended in the lateral direction of vehicle V2 parallel to axles 2a.

Figure 9:
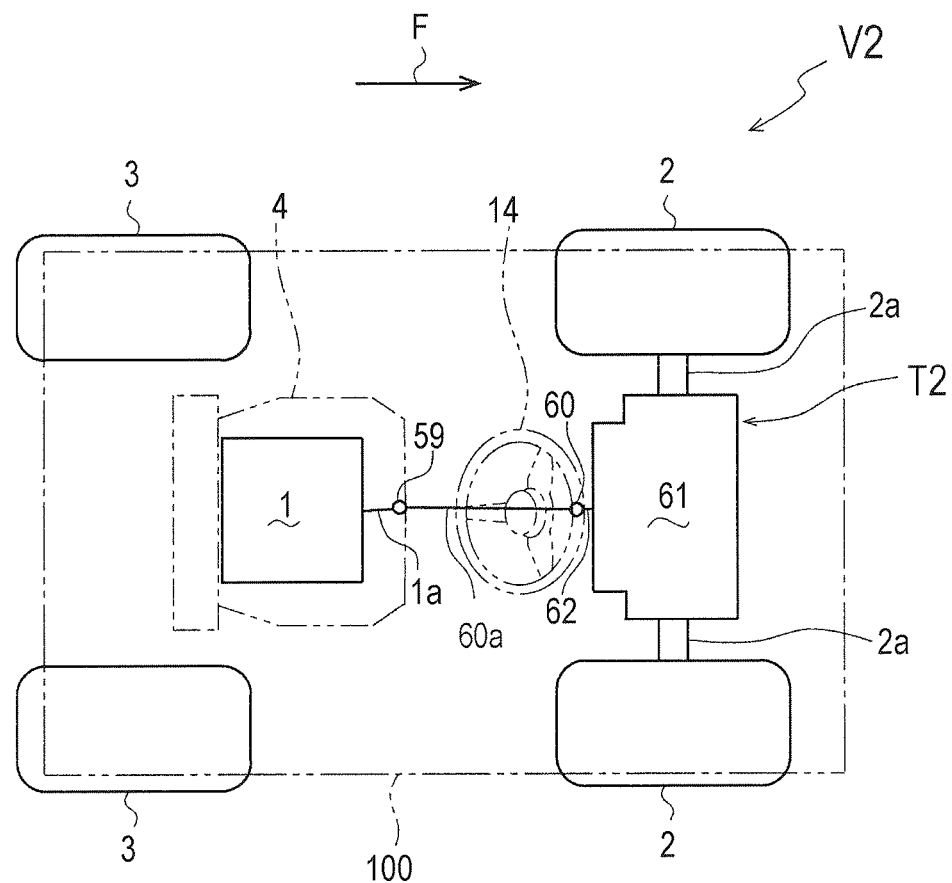
FIG. 9 is a schematic plan view of a vehicle V2 equipped with an integral transmission T2.

As shown in FIGS. 9, 10 and 11, input shaft 62 of transmission T2 projects rearwardly outward from the rear end of casing 61 so as to be drivingly connected to output shaft 1a of engine 1 via a propeller shaft 60a and universal joints 59 and 60 at both ends of propeller shaft 60a, thereby receiving power of engine 1. In casing 61, a bevel gear 63 is fixed on a front end of input shaft 62, and counter shaft 64 is disposed forward from input shaft 62 and is fixedly provided thereon with a bevel gear 65 meshing with bevel gear 63. Spur gear 30 is fixed on counter shaft 64, and pump shaft 22 is disposed forward from counter shaft 64 and is fixedly provided thereon with spur gear 32 meshing with gear 30. Therefore, power is transmitted from fore-and-aft horizontally axial input shaft 62 to laterally horizontally axial pump shaft 22.

Casing 61 of transmission T2 incorporates HST 6, which is configured to be centered on pump shaft 22 similar to that of transmission T1, and a forward/backward traveling direction selecting unit (hereinafter, "reverser") 7A driven by HST 6. Reverser 7A includes reverser clutch 8, which is similar to that of transmission T1, a forward traveling gear train 9Fa and a backward traveling gear train 9Ra. Gear trains 9Fa and 9Ra are disposed on the downstream side of reverser clutch 8. As shown in FIG. 11, clutch shaft 66 is disposed below counter shaft 64 and pump shaft 22, and a gear 67 is fixed on clutch shaft 66 and meshes with gear 33 fixed on motor shaft member 23 of HST 6. Reverser clutch 8 is configured centered on clutch shaft 66 similar to that of transmission T1, which is configured centered on clutch shaft 24. In this regard, gears 35 and 38 are fitted on clutch shaft 66 on left and right sides of reverser clutch 8 so as to be rotatable relative to clutch shaft 66, similar to those of transmission T1. When forward traveling clutch 8F of reverser clutch 8 is engaged, gear 35 is connected to clutch shaft 66 via engaged forward traveling clutch 8F so as to be rotatable integrally with clutch shaft 66. When backward traveling clutch 8R of reverser clutch 8 is engaged, gear 38 is connected to clutch shaft 66 via engaged backward traveling clutch 8R so as to be rotatable integrally with clutch shaft 66.

The whole axial length of clutch shaft 66 in the lateral direction of vehicle V2 is shorter than the whole axial length of pump shaft 22 in the lateral direction of vehicle V2. In the lateral direction of vehicle V2, i.e., in the axial direction of pump shaft 22, each of right and left ends of clutch shaft 66 is disposed at the same position as each of right and left ends of pump shaft 22 or on the axially proximal side of each of the right and left ends of pump shaft 22, so that each of the right and left ends of clutch shaft 66 does not project distally from each of the right and left ends of clutch shaft 66 in the lateral direction of vehicle V2.

As shown in FIG. 11, right and left differential yoke shafts 73 are disposed forward from clutch shaft 66, and as shown in FIG. 10, a differential unit 12A is configured between right and left differential yoke shafts 73. Differential unit 12A includes a differential casing 71. Gears 71a and 71b are fixed on differential casing 71 so as to serve as input shafts of differential unit 12A, and to also serve as output gears of forward and backward traveling gear trains 9Fa and 9Ra. Idle shaft 68 serving as a counter shaft of backward traveling gear train 9Ra is disposed below clutch shaft 66, and an idle gear 69 is provided on idle shaft 68. Right and left ends of idle shaft 68 are also disposed on axially proximal sides of the respective right and left ends of clutch shaft 66 in the lateral direction of vehicle V2. Gears 35 and 71a mesh with each other so as to serve as forward traveling gear train 9Fa. Gear 69 meshes with gears 38 and 71b, so that gears 38, 69 and 71b serve as backward traveling gear train 9R.

A differential pinion 72 is pivoted in differential casing 71, and a pivotal axis of differential pinion 72 is rotatable integrally with differential casing 71. Right and left differential yoke shafts 73 are inserted at proximal ends thereof into differential casing 71 through right and left ends of differential casing 71 so as to be rotatable relative to differential casing 71. In differential casing 71, right and left differential side gears 73a are fixed on the proximal ends of respective right and left differential yoke shafts 73, and mesh with differential pinion 72. Each of differential yoke shafts 73 projects at a distal end thereof outward from differential casing 71 so as to be fixedly provided on the distal end thereof with a sun gear 13a of planetary gear unit 13 serving as the speed reduction unit. In casing 61, a ring gear 13c of each of right and left planetary gear units 13 is fixed on a proximal end of each of axles 2a of respective right and left front wheels 2. Planetary gears 13b in each of planetary gear units 13 mesh with an internal gear formed on an inner periphery of ring gear 13c and also mesh with an internal gear 61a formed on casing 61. Therefore, planetary gears 13b of each planetary gear unit 13 receive the rotational power of differential yoke shaft 73 via sun gear 13a, and also receive a resistant force of casing 61 via internal gear 61a, thereby causing a resultant rotation which rotates ring gear 13c for rotating axle 2a.

Differential unit 12A is also entirely disposed between the right and left ends of pump shaft 22 in the lateral direction of vehicle V2, i.e., in the axial direction of pump shaft 22. Further, at least a part of each planetary gear unit 13 is disposed on the axial proximal side of each of the right and left ends of pump shaft 22 in the lateral direction of vehicle V2, i.e., in the axial direction of pump shaft 22. Therefore, the right and left end portions of casing 61 supporting respective right and left axles 2a have a minimized width therebetween.

Figure 12:
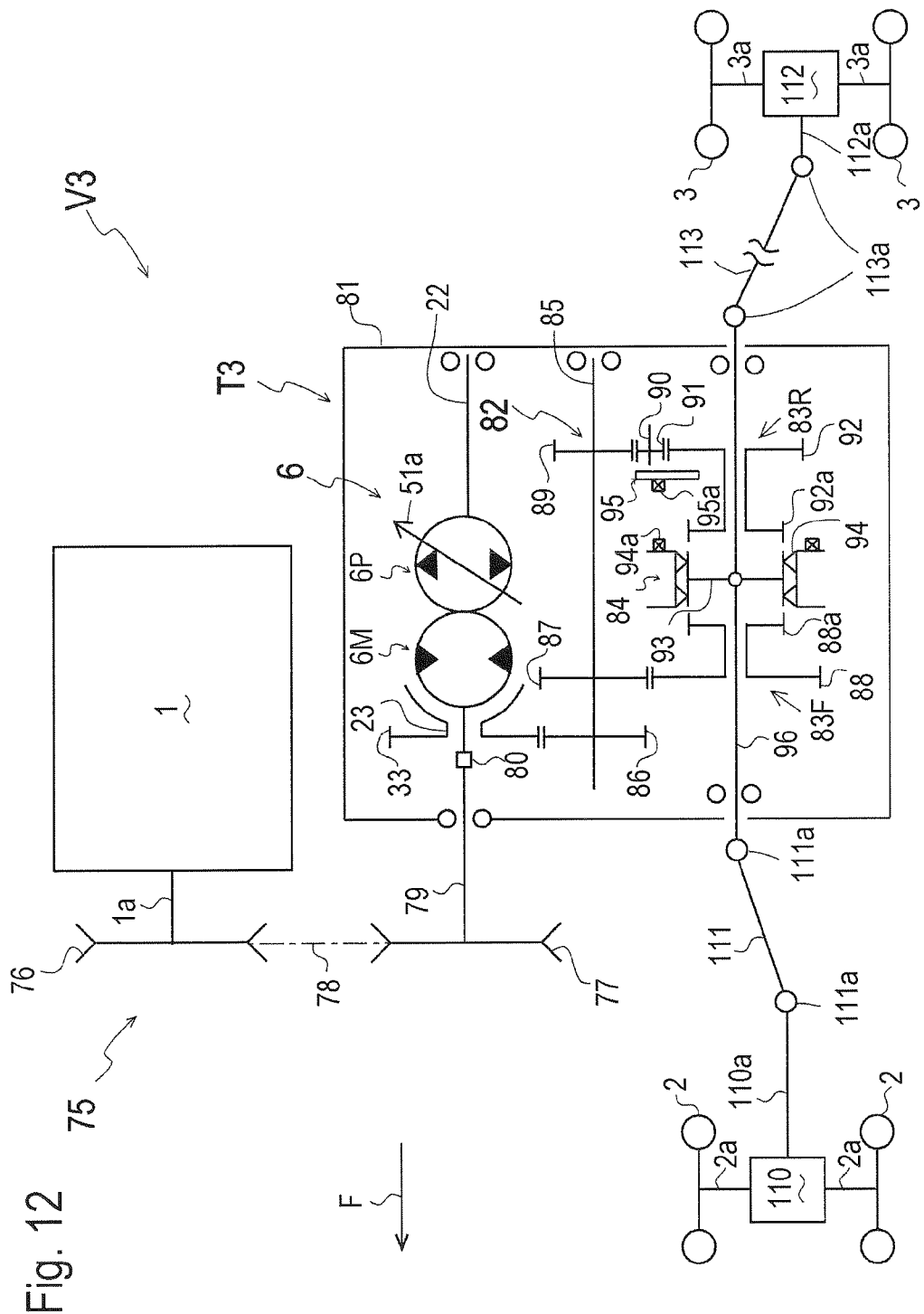
FIG. 12 is a skeleton diagram of a vehicle V3 equipped with an integral transmission T3.

Referring to FIG. 12, a vehicle V3 equipped with an integral transmission T3 will be described. Vehicle V3 is provided with right and left front wheels 2 and right and left rear wheels 3. Vehicle V3 is a four-wheel driving vehicle including engine 1, integral transmission T3, and a belt transmission 75 interposed between engine 1 and transmission T3. A front wheel driving transaxle 110 incorporates a differential unit for driving axles 2a of front wheels 2 and is disposed between right and left front wheels 2. A rear wheel driving transaxle 112 incorporates a differential unit for driving axles 3a of front wheels 3 and is disposed between right and left rear wheels 3. Each of transaxles 110 and 112 may incorporates speed reduction units, such as planetary gear units, between the differential unit and respective axles 2a or 3a.

In vehicle V3, engine 1 is disposed so as to have a horizontal axis extended in the fore-and-aft direction of vehicle V3. An input shaft 79 of transmission T3 is extended parallel to engine output shaft 1a. Input shaft 79 of transmission T3 also serves as an output shaft of belt transmission 75. Belt transmission 75 includes a drive pulley 76 fixed on engine output shaft 1a, a driven pulley 77 fixed on input shaft 79 of transmission T3, and a belt 78 interposed between pulleys 76 and 77. The power of engine 1 is transmitted to input shaft 79 via engine output shaft 1a and belt transmission 75. An output shaft 96 of transmission T3 projects at a front end thereof forward from a casing 81 of transmission T3 so as to be connected to an input shaft 110a of transaxle 110, thereby transmitting the output power of transmission T3 to right and left front wheels 2. Output shaft 96 of transmission T3 also projects at a rear end thereof rearward from casing 81 of transmission T3 so as to be connected to an input shaft 112a of transaxle 112, thereby transmitting the output power of transmission T3 to right and left rear wheels 3.

In casing 81 of transmission T3, pump shaft 22, a counter shaft 85, output shaft 96 and an idle (backward traveling counter) shaft 90 are extended horizontally in fore-and-aft direction of vehicle V3 so as to be parallel to one another. Pump shaft 22 is extended coaxially to input shaft 79 and is connected at a front end thereof to input shaft 79 via a coupling 80 so as to be rotatable integrally with input shaft 79. Coupling 80 may be similar to coupling sleeve 55. Pump shaft 22 and counter shaft 85 are journalled by a rear end wall of casing 81 via respective bearings. Preferably, a front end of counter shaft 85 is disposed at the same position as the front end of pump shaft 22 or rearward from the front end of pump shaft 22 in the fore-and-aft direction of vehicle V3, i.e., in the axial direction of pump shaft 22, so that counter shaft 85 is shorter than pump shaft 22, thereby reducing a forward expansion degree of casing 81.

Casing 81 of transmission T3 incorporates HST 6 and a reverser 82 driven by HST 6. HST 6 includes coaxial hydraulic pump 6P and 6M which are configured to be centered on pump shaft 22, similar to HST 6 of each of transmissions T1 and T2. HST 6 includes motor shaft member 23 which is fitted on pump shaft 22 rotatably relative to pump shaft 22. A gear 86 is fixed on counter shaft 85 and meshes with gear 33 fixed on motor shaft member 23, so that the engine power is transmitted to counter shaft 85 via belt transmission 75, HST 6 and gears 33 and 86. A forward traveling gear train 83F and a backward traveling gear train 83R are interposed between counter shaft 85 and output shaft 96. A reverser clutch 84 is configured on output shaft 96 and is provided with a braking mechanism. Forward traveling gear train 83F, backward traveling gear train 83R, reverser clutch 84 and the braking mechanism constitute reverser 82 which is a forward/backward traveling selecting unit which has a function of braking output shaft 96.

In reverser 82, gears 87 and 89 are fixed on counter shaft 85, and gears 88 and 92 are fitted on output shaft 96 so as to be rotatable relative to output shaft 96. Gears 87 and 88 mesh with each other so as to serve as forward traveling gear train 83F. An idle gear 91 is provided on idle shaft 90 and meshes with gears 89 and 92, so that gears 89, 91 and 92 serve as backward traveling gear train 83R.

Reverser clutch 84 is a dry meshing (synchromeshing) clutch in comparison with the set friction clutch serving as reverser clutch 8 of each of transmissions T1 and T2. Reverser clutch 84 includes a spline hub 93 fixed on output shaft 96 between gears 88 and 92, and includes a clutch slider 94 which is fitted on spline hub 93 so as to be slidable axially along spline hub 93 and unrotatable relative to spline hub 93. In this embodiment, forward traveling gear train 83F is disposed forward from reverser clutch 84, and backward traveling gear train 83R is disposed rearward from reverser clutch 84.

Clutch slider 94 is shiftable among four positions, i.e., a forward traveling position, a neutral position, a backward traveling position and a braking (parking) position, depending on its sliding on spline hub 93. Clutch slider 94 shown in FIG. 12 is disposed at the neutral position so as to be separated from gears 93 and 92 and a braking member 95, thereby realizing a neutral state of reverser 82 (reverser clutch 84) for isolating output shaft 96 from the output power of HST 6.

When clutch slider 94 is slid forward, i.e., toward forward traveling gear train 83F, from the neutral position and is set at the forward traveling position, clutch slider 94 meshes with a clutch-teethed portion 88a of gear 88, so that the output power of HST 6 is transmitted to output shaft 96 via counter shaft 85, gears 87 and 88 of forward traveling gear train 83F, clutch slider 94 and spline hub 93, thereby driving front wheels 2 and rear wheels 3 for forward traveling of vehicle V3.

When clutch slider 94 is slid backward, i.e., toward backward traveling gear train 83R, from the neutral position and is set at the backward traveling position, clutch slider 94 meshes with a clutch-teethed portion 92a of gear 92, so that the output power of HST 6 is transmitted to output shaft 96 via counter shaft 85, gears 89, 91 and 92 of backward traveling gear train 83R, clutch slider 94 and spline hub 93, thereby driving front wheels 2 and rear wheels 3 for backward traveling of vehicle V3.

When clutch slider 94 is slid further rearward, i.e., toward backward traveling gear train 83R, from the backward traveling position and is set at the braking position, clutch slider 94 is separated from clutch-teethed portion 92a and then meshes with an engagement portion 95a of braking member 95 which is fixed to casing 81, so that output shaft 96 is braked by braking member 95 via clutch slider 94 and spline hub 93. Therefore, front wheels 2 and rear wheels 3 are braked (parked) while being isolated from the output power of HST 6.

Figure 13:
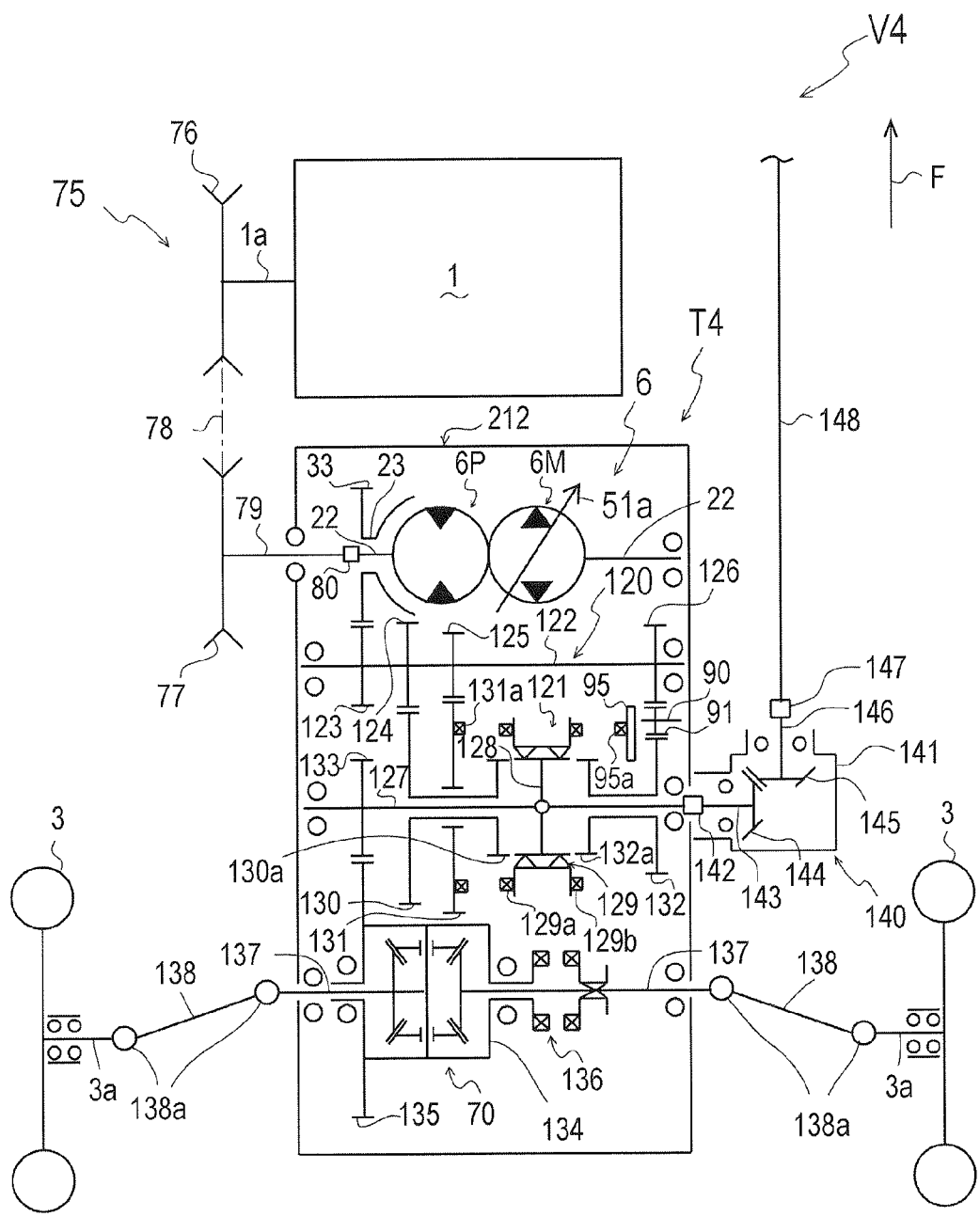
FIG. 13 is a skeleton diagram of a vehicle V4 equipped with an integral transmission T4.

Referring to FIG. 13, a vehicle V4 equipped with an integral transmission T4 will be described. Vehicle V4 is provided with right and left rear wheels 3 and with front wheels (not shown). Transmission T4 serves as a transaxle supporting axles 3a of rear wheels 3. Vehicle V4 includes engine 1 and belt transmission 75 for transmitting power from engine 1 to transmission T4. A casing 97 of transmission T4 incorporates HST 6 serving as a main speed-change unit, a sub-speed changing reverser 120 serving as a sub speed-change unit and a forward/backward traveling direction selecting unit, and differential unit 70 for driving rear wheels 3. A front wheel traveling PTO assembly 140 is externally attached onto casing 97. Alternatively, transmission T4 may serve as a transaxle supporting axles of front wheels, and PTO assembly 140 attached to transmission T4 may be provided for driving rear wheels.

In vehicle V4, engine 1 is disposed so as to orient the axis of engine output shaft 1a horizontally in the lateral direction of vehicle V4. Belt transmission 75 is similar to that shown in FIG. 12, and is interposed between engine output shaft 1a and input shaft 79 of transmission T3 (serving as the output shaft of belt transmission 75). In casing 97 of transmission T4, pump shaft 22, a counter shaft 122, a clutch shaft 127, idle shaft 90 and a pair of right and left differential yoke shafts 137 are extended horizontally in lateral direction of vehicle V4 so as to be parallel to one another. Pump shaft 22 is extended coaxially to input shaft 79 and is connected to input shaft 79 via coupling 80 similarly to that of transmission T3. Preferably, the whole axial length of sub-speed changing reverser 120 is the same as the whole axial length of HST 6 or smaller than the whole axial length of HST 6, so that shafts 122, 127 and 90 do not project at right and left ends thereof distally outward from the right and left ends of pump shaft 22 in the lateral direction of vehicle V4, i.e., in the axial direction of pump shaft 22.

In transmission T4, HST 6 includes coaxial hydraulic pump 6P and 6M which are configured centered on pump shaft 22, similar to HST 6 of each of transmissions T1, T2 and T3. HST 6 includes motor shaft member 23 which is fitted on pump shaft 22 rotatably relative to pump shaft 22. A gear 123 is fixed on counter shaft 122 and meshes with gear 33 fixed on motor shaft member 23, so that the engine power is transmitted to counter shaft 122 via belt transmission 75, HST 6 and gears 33 and 123. A high speed forward traveling gear train, a low speed forward traveling gear train and a backward traveling gear train are interposed between counter shaft 122 and clutch shaft 127. A reverser clutch 121 is configured on clutch shaft 127 and is provided with a braking mechanism. The high speed forward traveling gear train, the low speed forward traveling gear train, the backward traveling gear train, reverser clutch 121 and the braking mechanism constitute sub-speed changing reverser 120 which serves as the sub speed-change gear unit and the forward/backward traveling selecting unit, and has the function of braking clutch shaft 127.

In sub-speed changing reverser 120, gears 124, 145 and 126 are fixed on counter shaft 122, gears 130 and 132 are fitted on clutch shaft 127 so as to be rotatable relative to clutch shaft 127, and gear 131 is fitted on a boss portion of gear 130 so as to be rotatable relative to gear 130. Gears 124 and 130 mesh with each other so as to serve as the high speed forward traveling gear train. Gears 125 and 131 mesh with each other so as to serve as the low speed forward traveling gear train. Idle gear 91 is provided on idle shaft 90 and meshes with gears 132 and 126, so that gears 126, 91 and 132 serve as the backward traveling gear train.

Reverser clutch 121 is a dry dog (synchromeshing) clutch. Reverser clutch 121 includes a spline hub 128 fixed on clutch shaft 127, and includes a clutch slider 129 which is fitted on spline hub 128 so as to be slidable axially along spline hub 128 and unrotatable relative to spline hub 128. The boss portion of gear 130 is formed as a clutch-teethed portion 130a on an axial end facing one of right and left ends (in this embodiment, the left end) of spline hub 128. The boss portion of gear 132 is formed as a clutch-teethed portion 132a on an axial end facing the other of the right and left ends (in this embodiment, the right end) of spline hub 128. Clutch slider 129 is formed with engagement portions for engaging with respective clutch-teethed portions 130a and 132a. Further, gear 131 is formed with an engagement portion 131a, and braking member 95 is formed with engagement portion 95a. Clutch slider 129 is formed with an engagement portion 129a for meshing with engagement portion 131a, and is formed with an engagement portion 129b for meshing with engagement portion 95a.

Clutch slider 129 is shiftable among five positions, i.e., a low speed forward traveling position, a high speed forward traveling portion, a neutral position, a backward traveling position and a braking (parking) position, depending on its sliding on spline hub 128. Clutch slider 129 shown in FIG. 13 is disposed at the neutral position so as to disengage from all gears 130, 131 and 132 and braking member 95, thereby realizing a neutral state of sub-speed changing reverser 120 (reverser clutch 121) for isolating clutch shaft 127 from the output power of HST 6.

When clutch slider 129 is slid leftward, i.e., toward the forward traveling gear trains, from the neutral position and is set at the high speed forward traveling position, clutch slider 129 meshes with clutch-teethed portion 130a of gear 130, so that the output power of HST 6 is transmitted to clutch shaft 127 via counter shaft 122, gears 124 and 130 of the high speed forward traveling gear train, clutch slider 129 and spline hub 128, thereby driving front wheels 2 and rear wheels 3 for high speed forward traveling of vehicle V3.

When clutch slider 129 is slid further leftward, i.e., toward the forward traveling gear trains, from the high speed forward traveling position and is set at the low speed forward traveling position, clutch slider 129 is separated from clutch-teethed portion 130a and then meshes at engagement portion 129a thereof with engagement portion 131a of gear 131, so that the output power of HST 6 is transmitted to clutch shaft 127 via counter shaft 122, gears 125 and 131 of the low speed forward traveling gear train, clutch slider 129 and spline hub 128, thereby driving front wheels 2 and rear wheels 3 for low speed forward traveling of vehicle V3.

When clutch slider 129 is slid rightward, i.e., toward the backward traveling gear train, from the neutral position and is set at the backward traveling position, clutch slider 129 meshes with clutch-teethed portion 132a of gear 132, so that the output power of HST 6 is transmitted to clutch shaft 127 via counter shaft 122, gears 126, 91 and 132 of the backward traveling gear train, clutch slider 129 and spline hub 128, thereby driving front wheels 2 and rear wheels 3 for backward traveling of vehicle V3.

When clutch slider 129 is slid further rightward, i.e., toward the backward traveling gear train, from the backward traveling position and is set at the braking position, clutch slider 129 is separated from clutch-teethed portion 132a and then meshes with an engagement portion 95a of braking member 95 which is fixed to casing 97, so that clutch shaft 127 is braked by braking member 95 via clutch slider 129 and spline hub 128. Therefore, front wheels 2 and rear wheels 3 are braked (parked) while being isolated from the output power of HST 6.

A final pinion 133 is fixed on clutch shaft 127, and a differential input gear 135 is fixed on a differential casing 134 of a differential unit 70. Final pinion 133 and differential input gear 135 are spur gears, which mesh with each other. A pair of right and left output shafts 137 of transmission T4 serve as differential yoke shafts of differential unit 70 in casing 97. In casing 97, a differential lock mechanism 136 is provided on one of output shafts 137, so that, by operating differential lock mechanism 136, right and left output shafts 137 can be differentially locked to each other, i.e., can be engaged with each other so as to be rotatable integrally with each other. Output shafts 137 project outward from right and left distal ends of casing 97, so as to be connected at distal ends thereof to respective axles 3a of front wheels 3 via respective propeller shafts 138 with universal joints 138a.

A PTO assembly 140 includes a casing 141 and shafts 143 and 146 journalled in casing 141. Shafts 143 and 146 have respective axes perpendicular to each other. In casing 141, a bevel gear 144 is fixed on shaft 143, a bevel gear 145 is fixed on shaft 146, and bevel gears 144 and 145 mesh with each other. Casing 141 is externally fixed on casing 97. Shaft 143 is extended coaxially to clutch shaft 127, and is connected to clutch shaft 127 via a coupling 142 so as to be rotatable integrally with clutch shaft 127. Shaft 146 projects forward from casing 141 so as to serve as a front wheel driving PTO shaft. In this embodiment, PTO shaft 146 is extended coaxially to a front wheel driving propeller shaft 148, and is connected to propeller shaft 148 via a coupling 147 so as to be rotatable integrally with propeller shaft 148. Alternatively, PTO shaft 146 may be connected to propeller shaft 148 via a universal joint.

Figure 14:
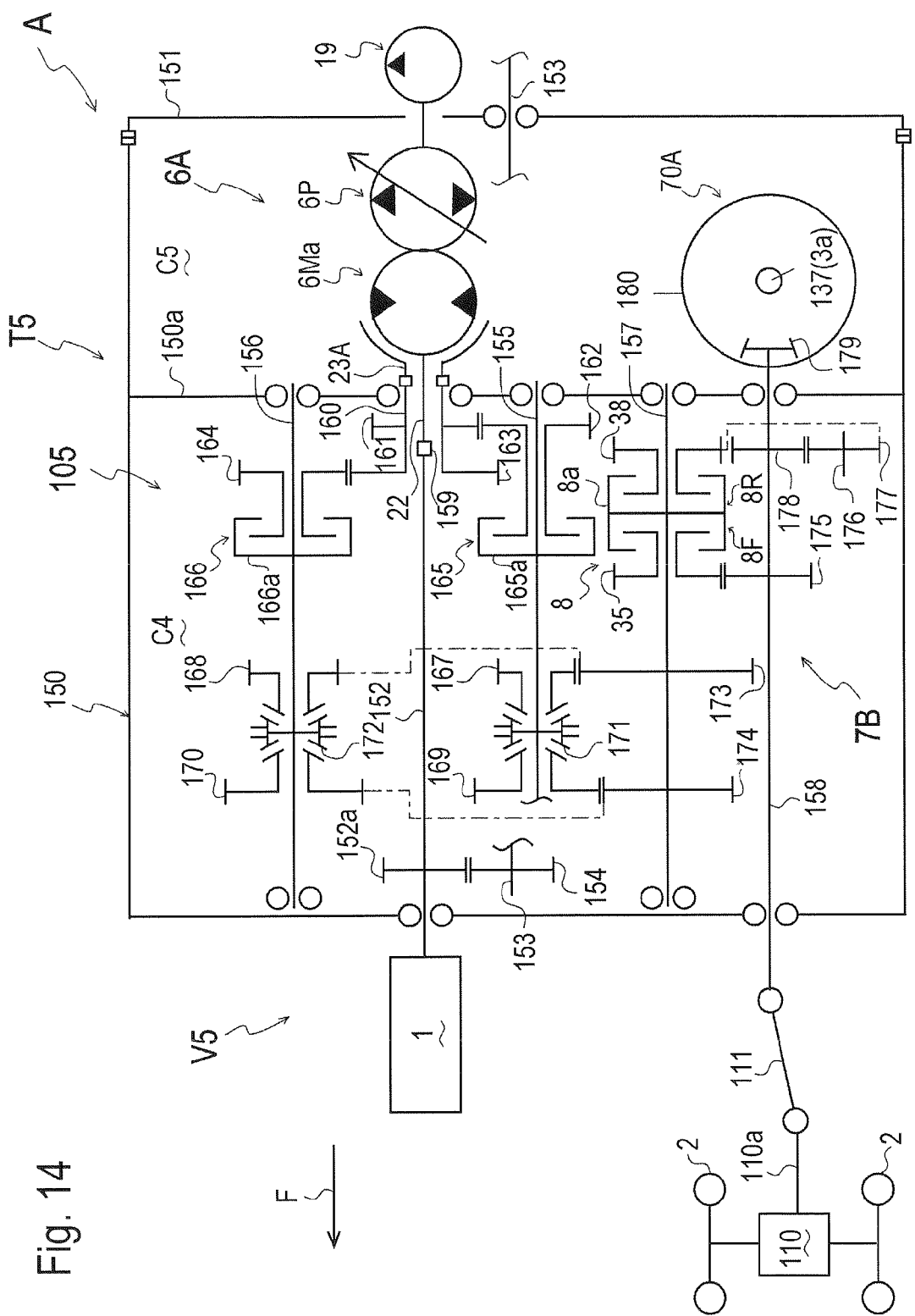
FIG. 14 is a skeleton diagram of a vehicle V5 equipped with an integral transmission T5.

Referring to FIG. 14, a vehicle V5 is a four-wheel driving vehicle equipped with an integral transmission T5, which serves as a transaxle supporting axles 3a of right and left rear wheels 3 so as to transmit power of engine 1 to rear wheels 3, and also transmits the power of engine 1 to right and left front wheels 2 via transaxle 110. Transmission T5 includes a casing 150, an HST 6A, a dual clutch type gear speed-changing unit 105, a reverser 7B, and a differential unit 70A. Casing 150 incorporates HST 6A, dual clutch gear speed-changing unit 105, reverser 7B and differential unit 70A. HST 6A serves as a main speed-changing unit, and gear speed-changing unit 105 serves as a sub speed-changing unit driven by HST 6A. Reverser 7B serves as a forward/backward traveling direction selecting unit driven by gear speed-changing unit 105.

Casing 150 is opened at a rear end thereof, and a rear cover 151 is detachably attached to the rear end of casing 150 by bolts or the like so as to cover the opening at the rear end of casing 150. A partition wall 150a is formed in casing 150. An inner space of casing 150 between a front end wall of casing 150 and rear cover 151 attached to the rear end of casing 150 is divided by partition wall 150a into a front gear chamber C4 and a rear axle chamber C5. Gear speed-changing unit 105 and reverser 7B are configured in gear chamber C4. HST 6A and differential unit 70A are configured in axle chamber C5.

An input shaft 152 of transmission T5 projects forward from the front end wall of casing 150 so as to be connected to an end of an output shaft (not shown) of engine 1. Input shaft 152 is extended in gear chamber C4 so as to have a horizontal axis in the fore-and-aft direction of vehicle V5. A PTO shaft 153 is also extended in gear chamber C4 so as to have a horizontal axis in the fore-and-aft direction of vehicle V5. In this way, input shaft 152 and PTO shaft 153 are extended parallel to each other. In the vicinity of the front end wall of casing 150, a gear 152a is fixed on input shaft 152, a gear 154 is fixed on PTO shaft 153, and gears 152a and 154 mesh with each other. Further, pump shaft 22 is extended in axle chamber C5 coaxially to input shaft 152, and is connected to input shaft 152 via a coupling 159 so as to be rotatable integrally with input shaft 152, i.e., to be unrotatable relative to input shaft 152. Coupling 159 is a sleeve having a splined hole. A splined rear end portion of input shaft 152 and a splined front end portion of pump shaft 22 are spline-fitted into the splined hole of coupling 159 so that shafts 152 and 22 are connected to each other so as to be rotatable integrally with each other. Coupling 159 is previously fixed on one of shafts 152 and 22, or may be formed integrally on one of shafts 152 and 22, so as to be ready to have the other shaft fitted thereunto. In this way, the rotational power of input shaft 152 driven by engine 1 is distributed between HST 6A and PTO shaft 153.

Similar to HST 6 of each of transmissions T1 to T4, HST 6A includes hydraulic pump 6P and a hydraulic motor 6Ma, which are configured centered on pump shaft 22. In this embodiment, hydraulic motor 6Ma has a motor shaft member 23A, and the different feature of motor shaft member 23A from motor shaft member 23 of hydraulic motor 6M of HST 6 is that input shaft 152 is detachably engaged to an input member 160 of gear speed-changing unit 105. Input member 160 is a cylindrical member fitted on input shaft 152 so as to be rotatable relative to input shaft 152. Gears 161 and 163 are fixed on input member 160 in gear chamber C4. The rear end of input shaft 152 is disposed in input member 160 so as to have coupling 159 thereon in input member 160. A rear portion of input member 160 projects into axle chamber C5 through partition wall 150a so as to have a rear end thereof, which is engageable to a front end portion of motor shaft member 23A by spline-fitting or the like.

Due to the above-mentioned structure, HST 6A and rear cover 151 serve as an integral assembly A which can be detachably connected to casing 150, input shaft 152 and gear speed-changing unit 105 in casing 150. When assembly A is attached, assembly A is moved to approach casing 150 while keeping pump shaft 22 coaxial to input shaft 152, whereby finally, motor shaft member 23A of HST 6A is engaged with input member 160 of gear speed-changing unit 105 by spline-fitting or the like, and pump shaft 22 is spline-fittingly engaged with input shaft 152 via coupling 159 in input member 160. After the engagement of motor shaft member 23A with input member 160 and the engagement of pump shaft 22 with input shaft 152 are completed, cover 151 is fastened to casing 150 by bolts or the like, thereby completing the attachment of assembly A. When assembly A is removed, the fastening of cover 151 to casing 150 is released by loosening the bolts or the like and is moved away from casing 150 in the axial direction of input shaft 152 so that motor shaft member 23A is naturally separated from input member 160, and pump shaft 22 is naturally separated from input shaft 152. Incidentally, charge pump 19 is provided on a rear end of pump shaft 22 projecting rearward from rear cover 151 joined to casing 150. It may be selected whether charge pump 19 is assembled in assembly Aa before being attached to casing 150, or whether charge pump 19 is provided on the rear end of pump shaft 22 after assembly Aa without charge pump 19 is attached to casing 150.

Incidentally, PCT 153 is journalled by rear cover 151 via a bearing and projects rearward from rear cover 151. PTO shaft 153 may be a single shaft formed integrally with a front portion and a rear portion so that the front portion having gear 154 thereon is disposed in gear chamber C4 and is supported at a front end thereof by the front end wall of casing 150 and the rear portion is supported by rear cover 151. Alternatively, one shaft serving as the front portion of PTO shaft 153 and another shaft serving as the rear portion of PTO shaft 153 may be connected to each other by spline-fitting via a coupling configured as mentioned above so as to complete PTO shaft 153. Due to this divisible structure of PTO shaft 153, compact assembly A including HST 6A and rear cover 151 can further include the shaft serving as the rear portion of PTO shaft 153. The same thing is said for PTO shaft 153 shown in FIG. 15.

Further, pump shaft 22 projects rearward (outward) from rear cover 151 so as to be provided on an outer end thereof with charge pump 19. Charge pump 19 is driven by pump shaft 22 so as to supply hydraulic fluid to HST 6A and to supply hydraulic fluid to wet first and second clutches 165 and 166 in gear speed-changing unit 105 and to reverser clutch 8, and to supply lubricating fluid to gears and clutches.

Dual clutch type gear speed-changing unit 105 includes a first clutch shaft 155 and a second clutch shaft 156. Shafts 155 and 156 are journalled at rear ends thereof by partition wall 150a via bearings. A clutch gear 162 is fitted on first clutch shaft 155 so as to be rotatable relative to first clutch shaft 155. A gear 161 is fixed on input member 160 and meshes with gear 162. A clutch drum 165a is fixed on first clutch shaft 155, and a wet friction clutch serving as a first clutch 165 is interposed between clutch gear 162 and clutch drum 165a. A clutch gear 164 is fitted on second clutch shaft 156 so as to be rotatable relative to second clutch shaft 156. A gear 163 is fixed on input member 160 and meshes with gear 164. A clutch drum 166a is fixed on second clutch shaft 156, and a wet friction clutch serving as a second clutch 166 is interposed between clutch gear 164 and clutch drum 166a.

A first (minimum) speed drive gear 167 and a third speed drive gear 167 are fitted on first clutch shaft 155 so as to be rotatable relative to first clutch shaft 155. A shifter 171 is disposed between gears 167 and 169. Shifter 171 includes a spline hub fixed on first clutch shaft 155, and includes a clutch slider fitted on the spline hub so as to be slidable axially on the spline hub and to be unrotatable relative to the spline hub. The clutch slider of shifter 171 is configured as a dog (synchromeshing) clutch to be engaged to each of gears 167 and 169, and is shiftable among a first speed position where it engages with gear 167 and disengages from gear 169, a third speed position where it engages with gear 169 and disengages with gear 167, and a neutral position where it disengages from gears 167 and 169. By engaging first clutch 165 when the clutch slider of shifter 171 is set at either the first or third speed position, the rotational power of input member 160 driven by HST 6A is transmitted to first clutch shaft 155 via engaged first clutch 165, and to gear 167 or 169 engaged to the clutch slider of shifter 171.

A second speed drive gear 168 and a fourth (maximum) speed drive gear 170 are fitted on second clutch shaft 156 so as to be rotatable relative to second clutch shaft 156. A shifter 172 is disposed between gears 168 and 170. Shifter 172 includes a spline hub fixed on second clutch shaft 156, and includes a clutch slider fitted on the spline hub so as to be slidable axially on the spline hub and to be unrotatable relative to the spline hub. The clutch slider of shifter 172 is configured as a dog (synchromeshing) clutch to be engaged to each of gears 168 and 170, and is shiftable among a second speed position where it engages with gear 168 and disengages from gear 170, a fourth speed position where it engages with gear 170 and disengages with gear 168, and a neutral position where it disengages from gears 168 and 170. By engaging second clutch 166 when the clutch slider of shifter 172 is set at either the second or fourth speed position, the rotational power of input member 160 driven by HST 6A is transmitted to second clutch shaft 156 via engaged second clutch 166, and to gear 168 or 170 engaged to the clutch slider of shifter 172.

A reverser clutch shaft 157 is supported in gear chamber C4 so as to have a horizontal axis in the fore-and-aft direction of vehicle V5. A low speed driven gear 173 and a high speed driven gear 174 are fixed on reverser clutch shaft 157. Both first and second speed drive gears 167 and 168 mesh with gear 173. Both third and fourth speed drive gears 169 and 170 mesh with gear 174. In this way, gears 167 and 173 serve a first speed gear train, gears 169 and 173 serve as a third speed gear train, and the first and third speed gear trains are interposed between first clutch shaft 155 and reverser clutch shaft 157. On the other hand, gears 168 and 174 serve a second speed gear train, gears 170 and 174 serve as a fourth speed gear train, and the second and fourth speed gear trains are interposed between second clutch shaft 156 and reverser clutch shaft 157. When the speed stage of gear speed-changing unit 105 is shifted among the first to fourth speed stages by one step, first and second clutches 165 and 166 are alternately engaged and disengaged every the one step shift of the speed gear speed-changing unit 105. Therefore, to realize one of the first to fourth speed stages, the drive gear of the speed gear train corresponding to the target speed stage is engaged with the clutch slider of corresponding one of shifters 171 and 172, and clutch 165 or 166 corresponding to this shifter 171 or 172 is engaged to transmit the rotational power of input member 160 to clutch shaft 157 via this speed gear train and this shifter 171 or 172, and meanwhile, the other clutch 166 or 165 is disengaged so as to isolate the speed gear train corresponding to the last speed stage from the rotational power of input member 160 even while the drive gear of this speed gear train still engages with the corresponding clutch slider.

In gear chamber C4, reverser clutch shaft 157 and gears 35 and 38 are provided on reverser clutch shaft 157, an output shaft 158 is supported parallel to reverser clutch shaft 157, and gears 175 and 178 are fixed on output shaft 158. Gears 35 and 175 mesh with each other so as to serve as a forward traveling gear train. An idle shaft 176 serving as a backward traveling counter shaft is supported parallel to shafts 157 and 158, and an idle gear 177 is provided on idle shaft 176 and meshes with gears 38 and 178, so that gears 38, 177 and 178 serve as a backward traveling gear train. In this way, the forward traveling gear train, including gears 35 and 175, and the backward traveling gear train, including gears 38, 177 and 178, are interposed between reverser clutch shaft 157 and output shaft 158, so that reverser clutch 8, the forward traveling gear train and the backward traveling gear train constitute reverser 7B.

Output shaft 158 is extended rearward into axle chamber C5 through partition wall 150a, and is fixed on a rear end thereof with a bevel pinion 179 in axle chamber C5. Differential unit 70A for differentially connecting axles 3a of rear wheels 3 to each other is similar to differential unit 70 shown in FIG. 13, excluding that differential unit 70A has a bevel input gear 180 for receiving the rotational power of output shaft 158 having the longitudinal direction of vehicle V5 perpendicular to axles 3a, in comparison with differential unit 70 having spur input gear 135. Differential unit 70A may be provided with a differential lock mechanism which may be similar to that of differential unit 70. Speed-reduction units, such as planetary gear units, may be interposed between differential unit 70A and respective axles 3a.

A front end of output shaft 158 projects forward from the front end wall of casing 150 and is connected via propeller shaft 111 with universal joints to input shaft 110a of transaxle 110 which incorporates the differential unit differentially connecting axles 2a of right and left front wheels 2 to each other.

Figure 15:
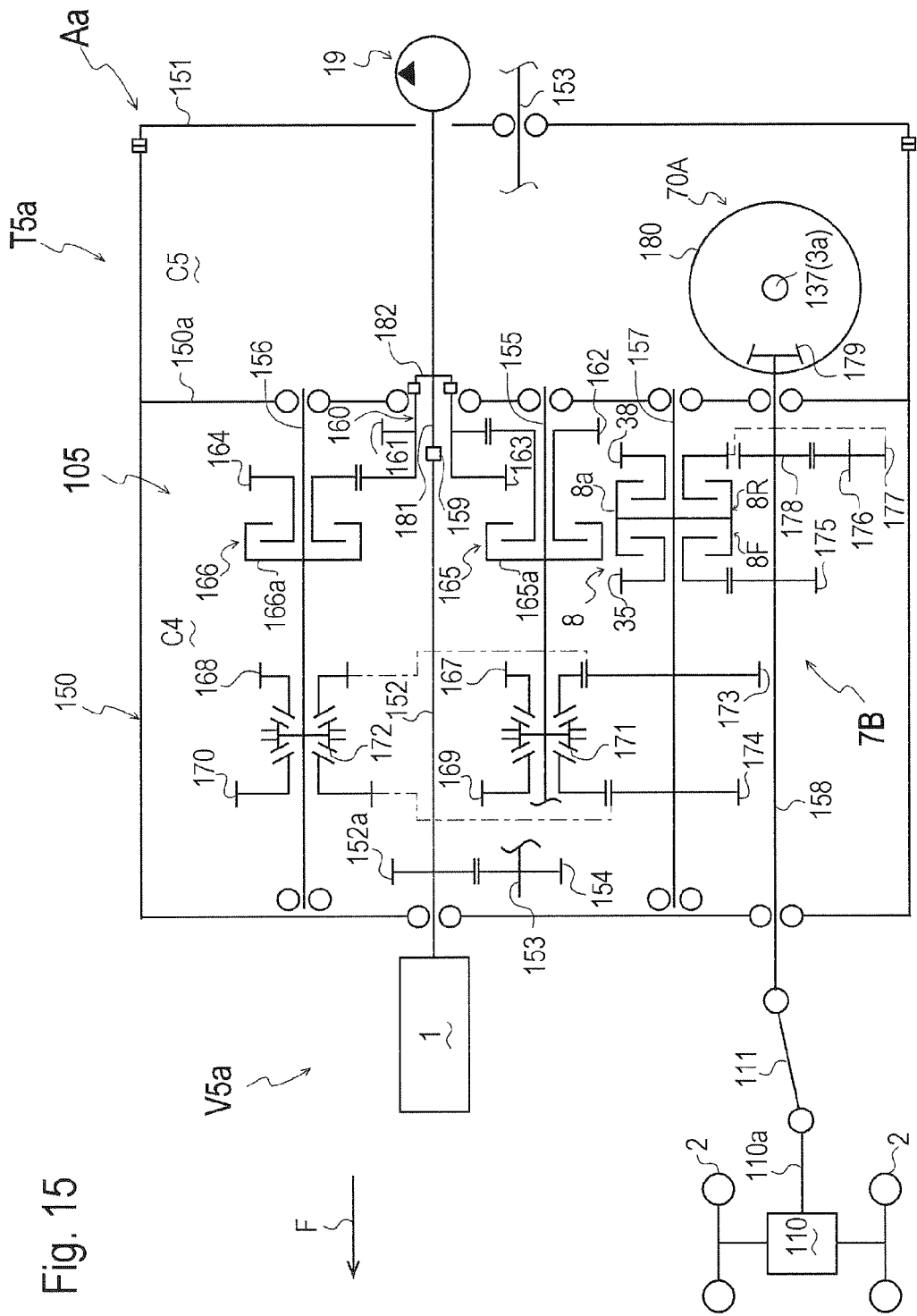
FIG. 15 is a skeleton diagram of a vehicle V5a equipped with an integral transmission T5a omitting an HST.

A Vehicle V5a shown in FIG. 15 is equipped with an alternative transmission T5a. Transmission T5a includes casing 150 incorporating gear speed-changing unit 105, reverser 7B and differential unit 70A, similar to casing 5 of transmission T5, however, transmission T5a includes an alternative assembly Aa attached to casing 150. Assembly Aa does not include HST 6A in comparison with assembly A including HST 6A. Hereinafter, only different things of transmission T5a from transmission T5 will be described. Assembly Aa includes rear cover 151 which supports a charge pump drive shaft 181 replacing pump shaft 22. Charge pump shaft 181 is not provided thereon with HST 6A. Charge pump shaft 181 is adapted at a front end thereof to be connected to input shaft 152 by spline-fitting via coupling 159. A power distributing member 182 is fixed on charge pump shaft 181. Instead of motor shaft member 23A, power distributing member 182 is fixed on charge pump shaft 181 so as to be able to engage with the rear end of input member 160 of gear speed-changing unit 105 by spline-fitting or the like.

Assembly Aa can be detachably attached to casing 150, input shaft 152 and input member 160. Charge pump 19 is provided on a rear end of charge pump shaft 181 projecting outward from rear cover 151. Similar to charge pump 19 of transmission T5, it may be selected whether charge pump 19 is assembled in assembly Aa before being attached to casing 150, or whether charge pump 19 is provided on charge pump shaft 181 after assembly Aa without charge pump 19 is attached to casing 150. In the condition that transmission T5a is provided with assembly Aa, charge pump shaft 181 is rotated integrally with input shaft 152 so as to drive charge pump 19, and to simultaneously drive input member 160 via power distributing member 182. In this way, transmission T5 includes HST 6A, serving as the main speed-changing unit, and gear speed-changing unit 105, serving as the sub speed-changing unit, whereas transmission T5a includes only gear speed-changing unit 105 instead of HST 6A. Either transmission T5 or transmission T5a can be selected depending on whether assembly A or assembly Aa is attached to casing 150.

Figure 16:
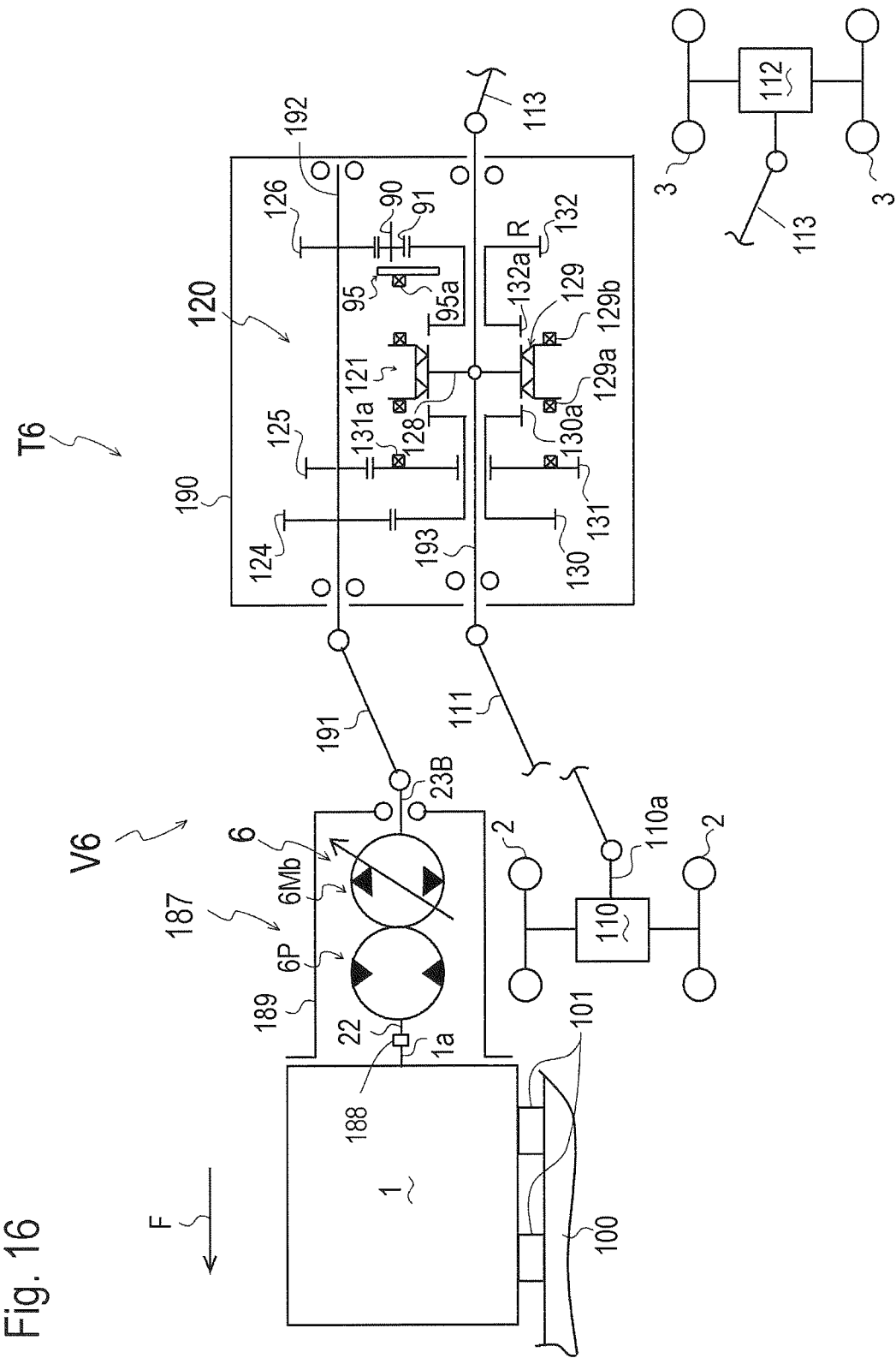
FIG. 16 is a skeleton diagram of a vehicle V6 equipped with a transmission T6 separated from an engine to which an HST is directly attached.

Referring to FIG. 16, vehicle V6 will be described. Vehicle V6 includes right and left front wheels 2, transaxle 110 for driving front wheels 2, right and left rear wheels 3, and transaxle 112 for driving rear wheels 3. Vehicle V6 is equipped with an HST assembly 187 and a transmission T6 for transmitting power from engine 1 to transaxles 110 and 112.

Engine 1 is mounted on vehicle body 100 via vibration-isolating members 101. HST assembly 187 includes a casing 189 and an HST 6B disposed in casing 189. Casing 189 is directly fixed to engine 1. Pump shaft 22 is disposed coaxially to engine output shaft 1a of engine 1, and is connected to engine output shaft 1a via a coupling 188 by spline-fitting. In this way, HST assembly 187 is attached to engine 1.

Transmission T6 includes a casing 190 and sub-speed reverser 120 disposed in casing 190. Sub-speed changing reverser 120 is similar to that of transmission T4 shown in FIG. 13. In casing 190, an input shaft 192, an output shaft 193 and idle (backward traveling counter) shaft 90 are supported so as to have respective horizontal axes extended in the fore-and-aft direction of vehicle V6. In this regard, gears 125, 125 and 126 are fixed on input shaft 192. Gears 130 and 132 are fitted on output shaft 193 so as to be rotatable relative to output shaft 193, and gear 131 is fitted on the boss portion of gear 130 so as to be rotatable relative to gear 130. Gears 124 and 130 mesh with each other so as to serve as the high speed forward traveling gear train. Gears 125 and 131 mesh with each other so as to serve as the low speed forward traveling gear train. Idle gear 91 on idle shaft 90 mesh with gears 126 and 132 so that gears 126, 91 and 132 serve as the backward traveling gear train. Sub-speed changing reverser 120 is provided with braking member 95. Clutch slider 129 fitted on spline hub 128 fixed on clutch shaft 193 is shiftable among the five positions, i.e., the high speed forward traveling position, the low speed forward traveling position, the neutral position, the backward traveling position and the braking (parking) position.

Transmission T6 is provided on vehicle V6 distantly from engine 1 and HST assembly 187. An output shaft (motor shaft) 23B of HST 6B projects at a rear end thereof rearward from casing 189, input shaft 192 of transmission T6 projects at a front end thereof forward from casing 190, and a propeller shaft 191 with universal joints is interposed between the rear end of HST output shaft 23B and the front end of input shaft 192 of transmission T6. Output shaft 193 of transmission T6 projects at a front end thereof forward from casing 190 so as to be connected to input shaft 110a of transaxle 110 via propeller shaft 111 with universal joints. Output shaft 193 projects at a rear end thereof rearward from casing 190 so as to be connected to input shaft 112a of transaxle 112 via propeller shaft 113 with universal joints.

Figure 17:
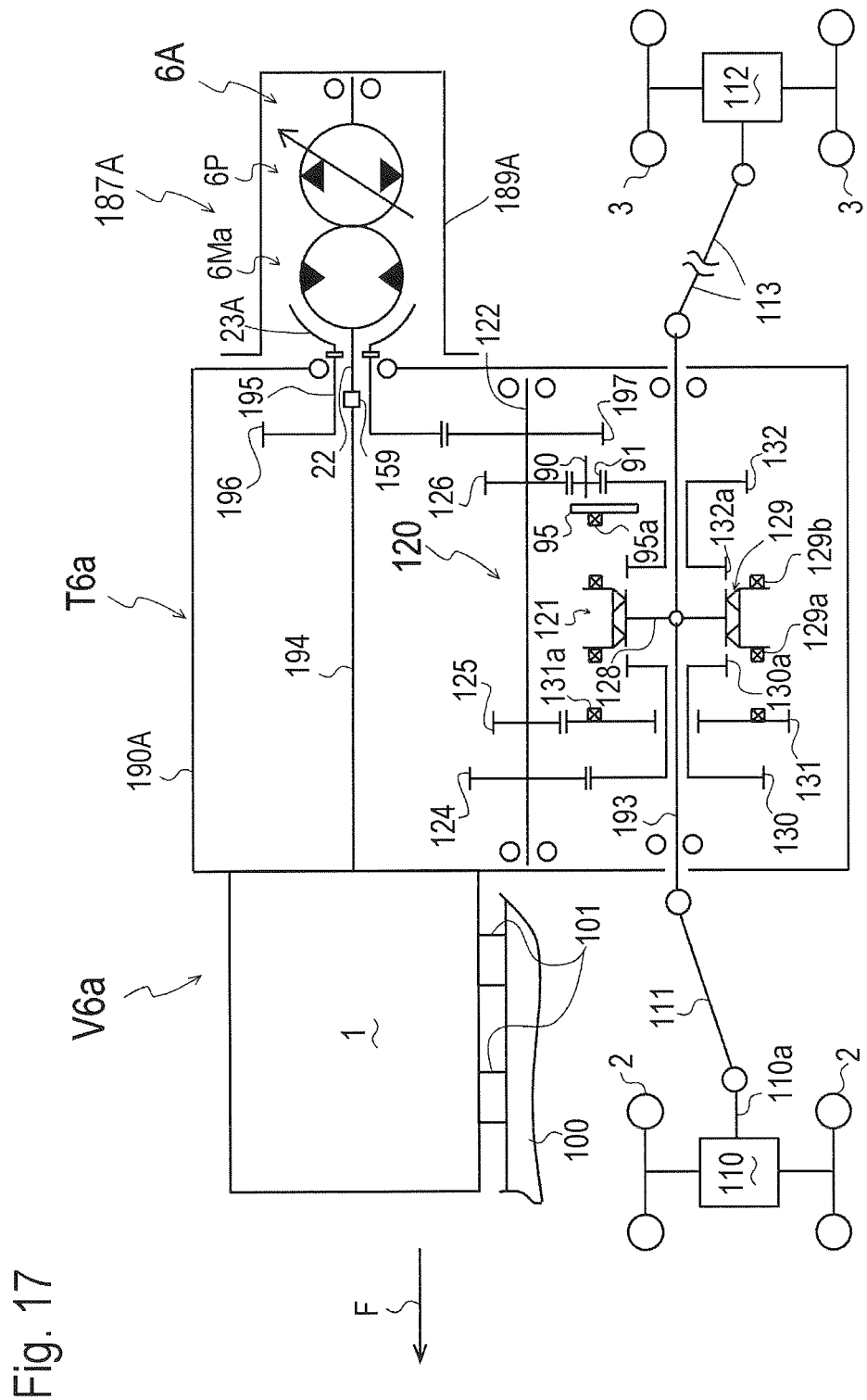
FIG. 17 is a skeleton diagram of a vehicle V6a equipped with a transmission T6 directly attached to an engine and with an HST externally attached to transmission T6.

Referring to FIG. 17, a vehicle V6a is equipped with an integral transmission T6a. In this embodiment, a casing 190A incorporating sub-speed changing reverser 120 is attached at a front end thereof to a rear end of engine 1, and casing 189 of an HST assembly 187A is attached at a front end thereof to a rear end of casing 190A, so that engine 1, casing 190A incorporating sub-speed changing reverser 120, and HST assembly 187A are joined together so as to define integral transmission T6a. An input shaft 194, shaft 122 serving as a speed-changing drive shaft in this embodiment, idle shaft 90 and output shaft 193 are supported in casing 190A so as to have respective horizontal axes extended in the fore-and-aft direction of vehicle V6a. Input shaft 194 is integral with engine output shaft 1a of engine 1 and is connected at a rear end thereof to pump shaft 22 of HST 6A of HST assembly 187A via a coupling 159 by spline-fitting or the like. A gear 196 is fitted on input shaft 194 so as to be rotatable relative to input shaft 194, and has a boss whose rear end is connected to motor shaft member 23A of HST 6A by spline-fitting or the like. Therefore, the engagement and disengagement between motor shaft member 23A and gear 196, and the engagement and disengagement between pump shaft 22 and input shaft 194 can be easily performed by only movement of HST assembly 187A toward or away from casing 190A in the axial direction of input shaft 194 when casing 189A is separated from casing 190A.

A gear 197 is fixed on speed-changing drive shaft 122 and meshes with gear 196 fitted on input shaft 194, so that the output power of HST 6A is transmitted to speed-changing drive shaft 122 via gears 196 and 197. In this embodiment, speed-changing reverser 120 includes drive gears 124, 125 and 126 fixed on speed-changing drive shaft 122, so as to be configured between speed-changing drive shaft 122 and output shaft 193. Similar to output shaft 193 shown in FIG. 16, output shaft 193 projects at front and rear ends thereof forward and rearward from casing 190A so as to be drivingly connected to front and rear transaxles 110 and 112.

Figure 18:
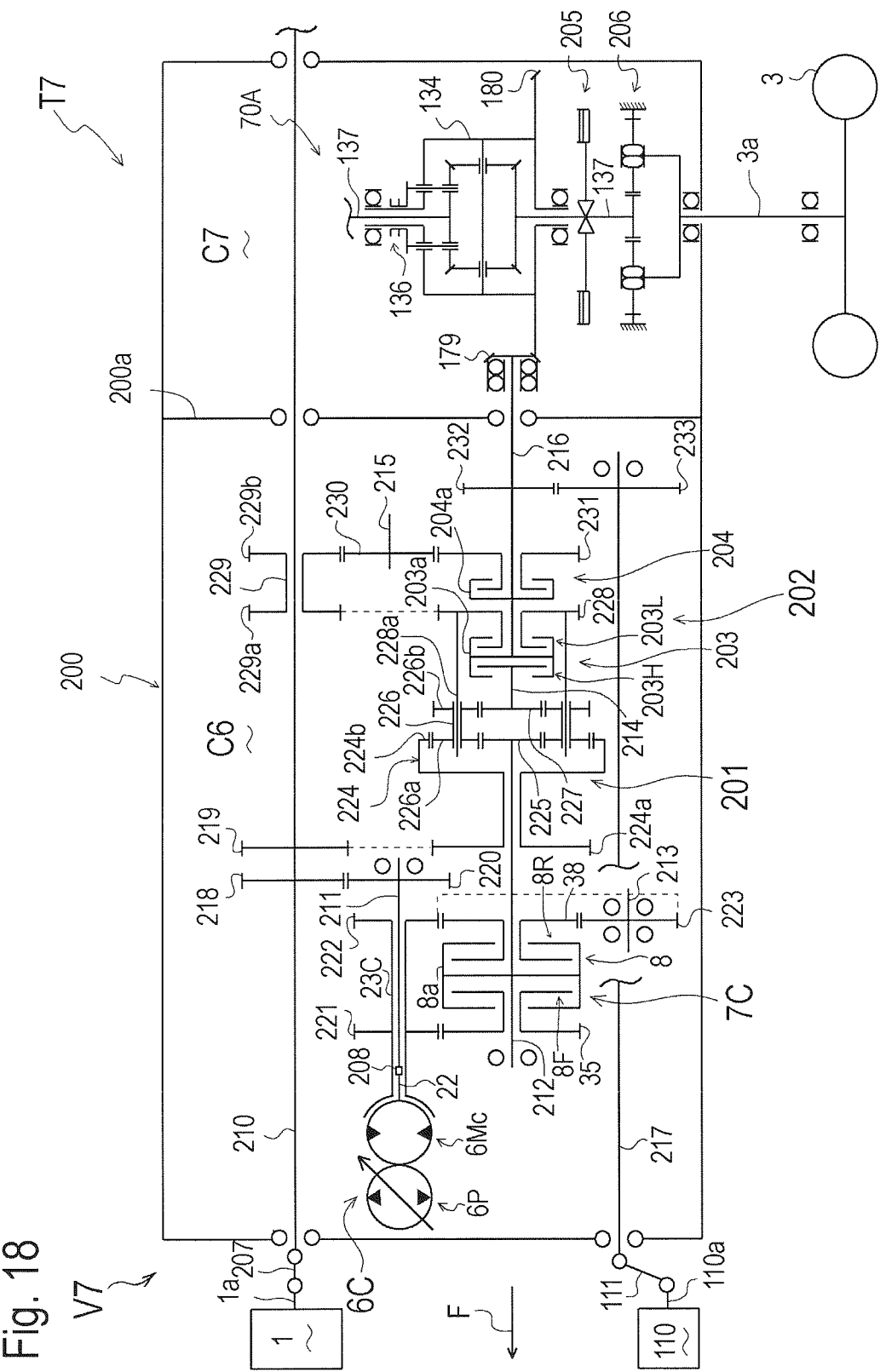
FIG. 18 is a skeleton diagram of a vehicle T7 equipped with an integral transmission T7.

Referring to FIG. 18, a vehicle V7 is equipped with engine 1, an integral transmission T7 serving as a rear wheel driving transaxle, and front wheel driving transaxle 110. Transmission T7 includes an HST 6C serving as a main speed-changing unit, a reverser 7C, a planetary gear unit 201, a speed-changing reverser 202 and differential unit 70A, and includes a casing 200 incorporating HST 6C, reverser 7C, planetary gear unit 201, speed-changing reverser 202 and differential unit 70A.

Casing 200 is provided therein with a partition wall 200a, and with a transmission chamber C6 and an axle chamber C7 which are partitioned from each other by partition wall 200a. Axles 3a of right and left rear wheels 3 are supported by casing 200 of transmission T7 in axle chamber C7. Differential unit 70A is disposed in axle chamber C7, and has right and left differential yoke shafts 137 differentially connected to each other. Differential yoke shafts 137 are provided thereon with respective brakes 205, and are connected to respective axles 3a via respective planetary gear units 206 serving as speed-reduction units. Further, differential unit 70A is provided with differential lock mechanism 136.

In casing 200, an output shaft 216 having a horizontal axis extended in the fore-and-aft direction of vehicle V7 is supported through partition wall 200a. In axle chamber C7, bevel pinion 179 is fixed on a rear end of output shaft 216, and meshes with bevel input gear 180 fixed on differential casing 134 of differential unit 70A. In transmission chamber C6, a gear 232 is fixed on output shaft 216. A front wheel drive shaft 217 having a horizontal axis extended in the fore-and-aft direction of vehicle V7 is supported in casing 200. A gear 233 is fixed on front wheel drive shaft 217 and meshes with gear 232. Front wheel drive shaft 217 projects at a front end thereof forward from casing 200 so as to be connected to input shaft 110a of transaxle 110 via propeller shaft 111 with universal joints. In this way, power of output shaft 216 is transmitted to right and left rear wheels 3 via differential unit 70A and right and left planetary gear units 206, and is transmitted to front wheel driving transaxle 110 via gears 232 and 233 and front wheel drive shaft 217.

In addition to shafts 216 and 217, an input shaft 210, a transmission shaft 211, pump shaft 22, a reverser clutch shaft 212, an idle (reversing counter) shaft 213, a high speed clutch shaft 214 and an idle (backward traveling counter) shaft 215 are supported in casing 200 so as to have respective horizontal axes in the fore-and-aft direction of vehicle V7 in parallel to one another. Input shaft 210, serving as an input shaft of transmission T7, projects at a front end thereof forward from a front end of casing 200 and is connected to output shaft 1*a* of engine 1 via a propeller shaft 207 (with universal joints or splined coupling sleeves). Input shaft 210 also serves as a PTO shaft projecting rearward from a rear end of casing 200. Input shaft 210 may be made of a single shaft defining its whole length between the front end and the rear end, or may be dividable at an intermediate portion or intermediate portions thereof into two or more divisional shafts.

A gear 218 is fixed on input shaft 210, a gear 220 is fixed on transmission shaft 211, and gears 218 and 220 mesh with each other. Transmission shaft 211 is connected to coaxial pump shaft 22 via a coupling 208 so as to be unrotatable relative to pump shaft 22. HST 6C includes hydraulic pump 6P and a hydraulic motor 6Mc which are configured centered on pump shaft 22. Hydraulic motor 6Mc has a cylindrical motor shaft member 23C fitted on pump shaft 22 and transmission shaft 211 so as to be rotatable relative to shafts 22 and 211. A normal rotation drive gear 221 and a reverse rotation drive gear 222 are fixed on motor shaft member 23C. Hydraulic motor 6Mc may be replaced with hydraulic motor 6Ma whose motor shaft member 23A is detachably engaged with a gear member on the downstream side thereof similar to that shown in FIG. 14. If this structure is adapted to this embodiment, motor shaft member 23A is separated from another cylindrical member having gears 221 and 222 fixed thereon so as to be detachably engaged with this cylindrical member by spline-fitting.

In this embodiment, gear 35 serves as a normal rotation driven gear, gear 38 serves as a reverse rotation driven gear, and gears 35 and 38 are fitted on reverser clutch shaft 212 so as to be rotatable relative to reverser clutch shaft 212. Reverser clutch 8 serves as a normal/reverse rotation direction selecting unit, clutch 8F of reverser clutch 8 serves as a normal rotation clutch, and clutch 8R of reverser clutch 8 serves as a reverse rotation clutch. Gears 221 and 35 mesh with each other so as to serve as a normal rotation gear train. An idle gear 223 is provided on idle shaft 213 and mesh with gears 38 and 222, so that gears 222, 223 and 38 serve as a reverse rotation gear train. In this way, reverser 7C includes reverser clutch 8, the normal rotation gear train, and the reverse rotation gear train.

Clutch drum 8*a* of reverser clutch 8 is fixed on reverser clutch shaft 212. Normal rotation clutch 8F is a wet friction clutch interposed between clutch drum 8*a* and gear 35. Reverse rotation clutch 8R is a wet friction clutch interposed between clutch drum 8*a* and gear 38. When normal rotation clutch 8F is engaged and reverser rotation clutch 8R is disengaged, reverser 7C is set in a normal rotation state where the output power of HST 6C is transmitted to reverser clutch shaft 212 via the normal rotation gear train, i.e., gears 221 and 35. When normal rotation clutch 8F is disengaged and reverser rotation clutch 8R is engaged, reverser 7C is set in a reverse rotation state where the output power of HST 6C is transmitted to clutch shaft 212 via the reverse rotation gear train, i.e., gears 222, 223 and 38. When both clutches 8F and 8R are disengaged, reverser 7C is set in a neutral state where reverser clutch shaft 212 is isolated from the output power of HST 6C.

In this way, reverser clutch 8 of each of transmissions T1, T2 and T5 for selecting whether the traveling direction of the vehicle is forward or backward is also adaptable as reverser clutch 8 of transmission T7 for selecting whether the rotation direction of clutch shaft 212 is normal or reverse. The structure of the forward and backward traveling gear trains of any of reverser 7, 7A and 7B is also adaptable as the structure of the normal and reverse rotation gear trains of reverser 7C. In other words, reverser 7C serving as the normal/reverse rotation direction selecting unit can be structurally identical to any of reversers 7, 7A and 7B serving as the forward/backward traveling direction selecting unit. Reverser 7C differs from reversers 7, 7A and 7B in only purpose. That is, the switching of output rotational direction of each of reversers 7, 7A and 7B is directly reflected as the switching of forward/backward rotational direction of axles 2*a* and 3*a*, i.e., of the forward/backward traveling direction of the vehicle, whereas the switching of output rotational direction of reverser 7C, i.e., the switching of rotational direction of reverser clutch shaft 212, is intended to expand a variable speed range of its downstream shaft in one rotational direction.

Planetary gear unit 201 includes a first sun gear 225, first and second planetary gears 226*a* and 226*b* fixed on a planetary gear member 226, a ring gear 224, a second sun gear 227, and a low speed forward traveling driven gear 228 serving as a carrier. First sun gear 225 is fixed on a rear end of reverser clutch shaft 212. Ring gear 224 is fitted on reverser clutch shaft 212 so as to be rotatable relative to reverser clutch shaft 212. A gear 224*a* is fixed on ring gear 224 and meshes with a gear 219 fixed on input shaft 210. An internal gear 224*b* is formed on an inner periphery of ring gear 224. First planetary gears 226*a* of respective planetary gear members 226 are interposed between internal gear 224*b* and first sun gear 225, i.e., each of first planetary gears 226*a* meshes with both gears 224*b* and 225. Ring gear 224 rotates by power from input shaft 210 via gears 219 and 224*a*, and first sun gear 225 rotates by power from input shaft 210 via gears 218 and 220, HST 6C and reverser 7C. As a result, planetary gear member 226 having first planetary gear 226*a* revolves centered on first sun gear 225 by the resultant power of rotations of respective gears 224 and 225.

High speed clutch shaft 214 is extended coaxially to reverser clutch shaft 212 and disposed rearward from reverser clutch shaft 212. Second sun gear 227 is fixed on a front end of high speed clutch shaft 214 and meshes with second planetary gear 226*b* fixed on planetary gear member 226. First planetary gear 226*a* and second planetary gear 226*b* may have different diameters, i.e., first sun gear 225 and second sun gear 227 may have different diameters, so that the gear ratio between gears 226*a* and 225 may be different from the gear ratio between gears 226*b* and 227, whereby the rotational speed of second sun gear 227 can be higher or lower than the rotational speed of first sun gear 225.

Low speed forward traveling driven gear 228 and a backward traveling driven gear 231 are fitted on output shaft 216 so as to be rotatable relative to output shaft 216. Planetary gear members 226 are pivoted on respective pivotal shafts 228*a* projecting from low speed forward traveling driven gear 228 which serves as the carrier of planetary gear unit 201. Gears 229*a* and 229*b* are fixed on a gear member 229, and gear member 229 is fitted on input shaft 210 so as to be rotatable relative to input shaft 210. An idle gear 230 is provided on idle shaft 215. Gear 228 meshes with gear 229*a*, and idle gear 230 mesh with gears 229*b* and 231.

Output shaft 216 is extended coaxially to high speed clutch shaft 214 and is disposed rearward from output shaft 216. A forward traveling speed-changing clutch 203 is configured between high speed clutch shaft 214 and output shaft 216. Forward traveling speed-changing clutch 203 includes a clutch drum 203a fixed on a front end of output shaft 216, and includes two wet friction clutches. One wet friction clutch serves as a high speed forward traveling clutch 203H whose friction discs are interposed between clutch drum 203a and high speed clutch shaft 214. The other wet friction clutch serves as a low speed forward traveling clutch 203L whose friction discs are interposed between clutch drum 203a and low speed forward traveling driven gear 228. Backward traveling clutch 204 includes a clutch drum 204a fixed on output shaft 216, and includes a wet friction clutch whose friction discs are interposed between clutch drum 204a and backward traveling drive gear 231.

As mentioned above, planetary gear members 226 serve as output members of planetary gear unit 201. A high speed forward traveling gear train, a low speed forward traveling gear train, a backward traveling gear train and speed-changing reverser 202 are configured between planetary gear unit 201 and output shaft 216. Speed-changing reverser 202 includes a forward traveling speed-changing clutch 203 and a backward traveling clutch 204. Gears 226b and 227 and high speed clutch shaft 214 constitute the high speed forward traveling gear train, which is drivingly connected to output shaft 216 by engaging high speed forward traveling clutch 203H. Gear 228 rotates following the revolution of planetary gear member 226 so as to serve as the low speed forward traveling gear train, which is drivingly connected to output shaft 216 by engaging low speed forward traveling clutch 203L. Gears 228, 229a, 229b, 230 and 231 constitute the backward traveling gear train clutch, which is drivingly connected to output shaft 216 by engaging backward traveling clutch 204a.

When high speed forward traveling clutch 203H is engaged, i.e., when speed-changing reverser 202 is set in a high speed forward traveling state, second sun gear 227 rotates following the rotation of planetary gear members 226 centered on their own axes and the revolution of planetary gear members 226 around first sun gear 225 so that high speed clutch shaft 214 rotates integrally with sun gear 227 so as to transmit its rotation to output shaft 216 via engaged clutch 203H. At this time, low speed forward traveling clutch 203L and backward traveling clutch 204 are disengaged, so that gears 229a, 229b, 230, 231 idle according to the rotation of gear 228 following the revolution of planetary gear member 226 around sun gear 225.

When low speed forward traveling clutch 203L is engaged, i.e., when speed-changing reverser 202 is set in a low speed forward traveling state, the rotation of low speed forward traveling driven gear 228 following the revolution of planetary gear members 226 around sun gear 225 is transmitted to output shaft 216 via engaged clutch 203L. At this time, high speed forward traveling clutch 203H is disengaged so that sun gear 227 and high speed clutch shaft 214 idle according to the revolution of planetary gear member 226, and backward traveling clutch 204 is disengaged so that gears 229a, 229b, 230, 231 of the backward traveling gear train idle according to the rotation of gear 228.

When backward traveling clutch 204 is engaged, i.e., when speed-changing reverser 202 is set in a backward traveling state, the rotation of backward traveling driven gear 231 driven via gears 229a, 229b and 230 by the rotation of low speed forward traveling driven gear 228 following the revolution of planetary gear members 226 is transmitted to output shaft 216. At this time, high speed forward traveling clutch 203H is disengaged so that high speed clutch shaft 214 idles according to the revolution of planetary gear member 226, and low speed forward traveling clutch 203L is disengaged so that low speed forward traveling driven gear 228 rotates freely from the rotation of output shaft 216 receiving the rotation of gear 228 via the backward traveling gear train and engaged clutch 204.

If all clutch 203H, 203L and 204 are disengaged, i.e., if speed-changing reverser 202 is set in a neutral state, output shaft 216 is isolated from the rotation of second sun gear 227 following the rotation and revolution of planetary gear members 226, and from the rotation of gears 228, 229a, 229b, 230 and 231 following the revolution of planetary gear members 226.

Figure 19:
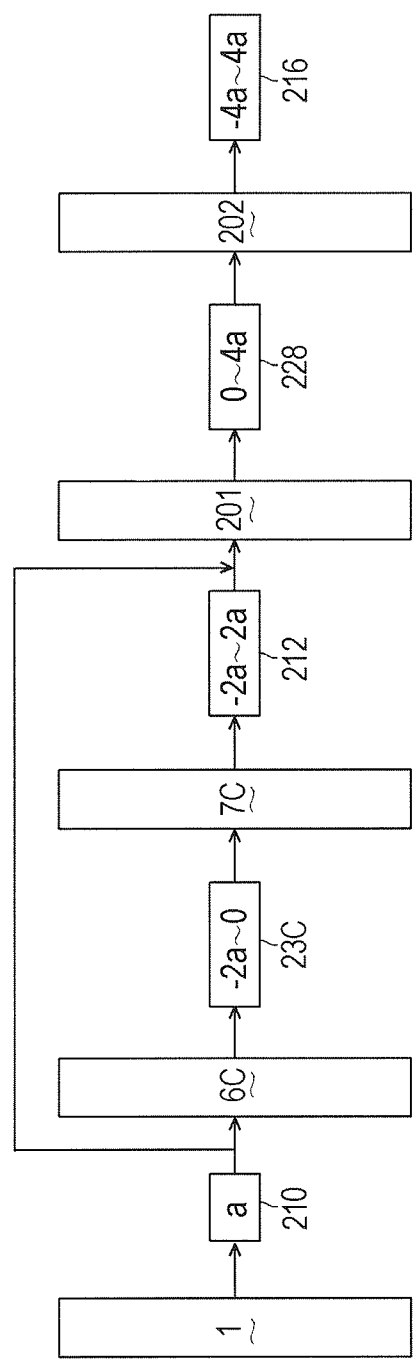
FIG. 19 is a block diagram showing change of variable speed range while power is transmitted through transmission T7.
Figure 20:
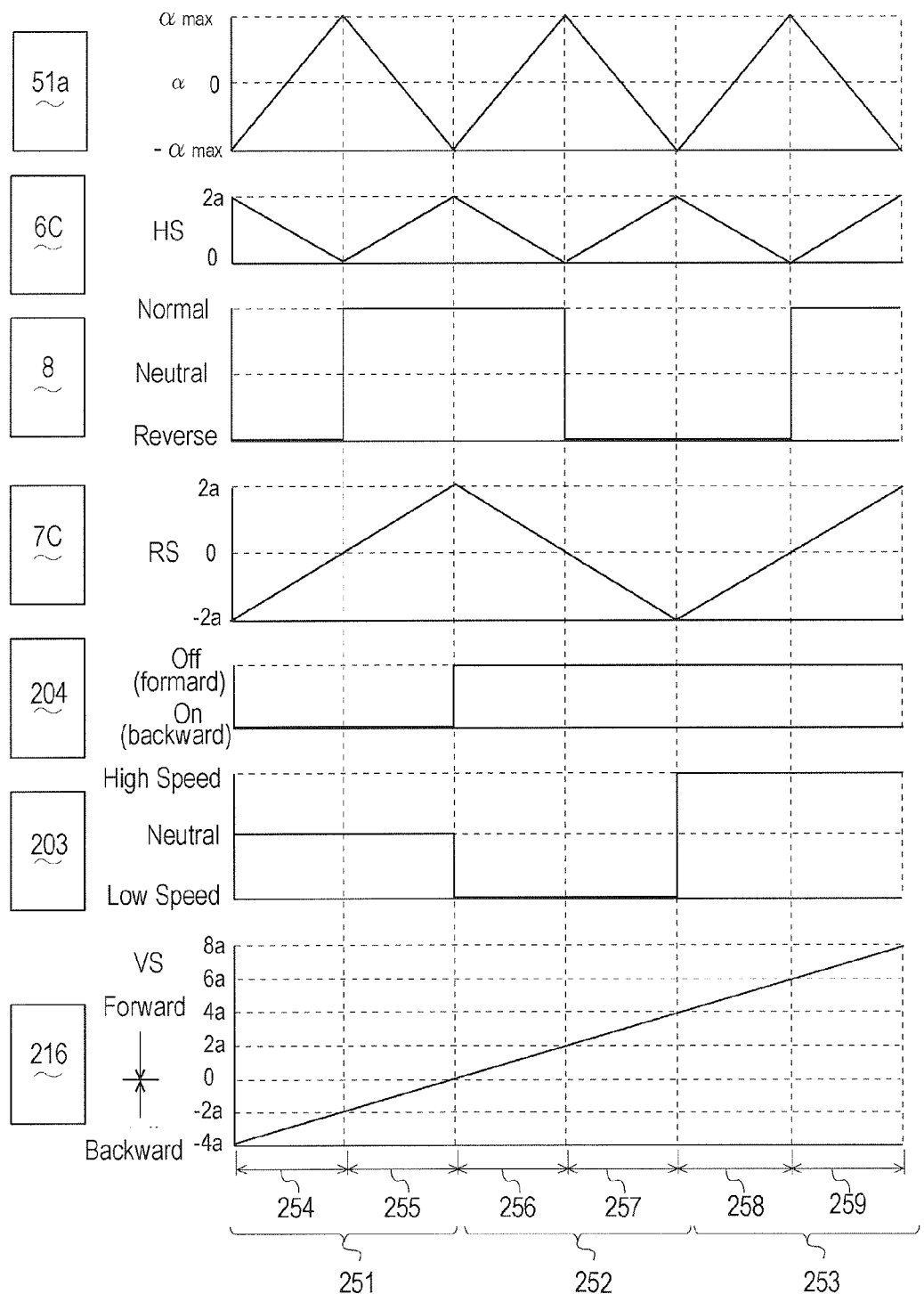
FIG. 20 is a chart showing control processes of units or parts in transmission T7 during a process of change of a vehicle speed (rotary speed of an output shaft) from a maximum backward traveling speed to a maximum forward traveling speed.

On the assumption that transmission T7 has the above-mentioned structure shown in FIG. 18, how the output rotation of engine 1 is changed in speed and direction via HST 6C, reverser 7C, planetary gear unit 201 and speed-changing reverser 202 until it reaches output shaft 216 will be described with reference to FIGS. 19 and 20. As shown in FIG. 20, it is assumed that a variable tilt angle $\alpha$ of pump swash plate 51a (hereinafter referred to as swash plate tilt angle $\alpha$) when it is tilted in one direction from a neutral position, where swash plate tilt angle $\alpha$ is zero, until it reaches $\alpha$max, is defined as positive, and swash plate tilt angle $\alpha$ when it is tilted in the other direction from the neutral position until it reaches $-\alpha$max, is defined as negative. Further, as shown in FIG. 19, it is assumed that input shaft 210 is rotated at a constant speed and in a constant direction by driving engine 1, and it is assumed that the speed ratio, i.e., output speed relative to input speed, obtained by HST 6C is 2 at its maximum. As shown in FIGS. 19 and 20, an output rotational speed HS of HST 6C in the constant direction is variable in a range between 0 and 2a. Speed HS is zero when swash plate tilt angle $\alpha$ is $\alpha$max. Speed HS increases as swash plate tilt angle $\alpha$ approaches $-\alpha$max. Speed HS becomes maximum speed 2a when swash plate tilt angle $\alpha$ reaches $-\alpha$max.

It is assumed that a gear ratio of each of the normal and reverse rotation gear trains is 1:1. When normal rotation clutch 8F of reverser clutch 8 is engaged, the rotation of motor shaft 23C is reflected as the rotation of reverser clutch shaft 212 in one direction having the variable speed range between 0 and 2a by the normal rotation gear train and engaged normal rotation clutch 8F. When reverse rotation clutch 8R of reverser clutch 8 is engaged, the rotation of motor shaft 23C is reflected as the rotation of reverser clutch shaft 212 in the other direction having the variable speed range between 0 and 2a by the reverse rotation gear train and engaged reverse rotation clutch 8R. It is assumed that the rotation speed of reverser clutch shaft 212 in the other direction is defined as negative so that it has a variable speed range between 0 and $-2a$. As shown in FIGS. 19 and 20, an output rotation speed RS of reverser 7C, which is the rotation speed of reverser clutch shaft 212, is variable in a range between $-2a$ (i.e., reverse rotation speed 2a) and 0 according to change of swash plate tilt angle $\alpha$ between $-\alpha$max and $\alpha$max when reverse rotation clutch 8R is engaged. This range of swash plate tilt angle $\alpha$ between $-\alpha$max and $\alpha$max during engagement of reverse rotation clutch 8R corresponds to ranges 254, 257 and 258 in FIG. 20. On the other hand, output rotation speed RS of reverser 7C is variable in a range between 2a (i.e., normal rotation speed 2a) and 0 according to change of swash plate tilt angle $\alpha$ between $-\alpha$max and $\alpha$max when normal rotation clutch 8F is engaged. This range of swash plate tilt angle $\alpha$ between $-\alpha$max and $\alpha$max during engagement of normal rotation clutch 8F corresponds to ranges 255, 256 and 259 in FIG. 20. Therefore, speed RS is variable in a range between −2a and 2a as appearing in ranges 251, 252 and 253 shown in FIG. 20 by combining one reciprocal tilt movement of pump swash plate 51a between −αmax and αmax with switching of engagement and disengagement between clutches 8F and 8R in reverser clutch 8 when pump swash plate 51a is tilted at angle αmax for zeroing HST output speed HS. In this way, reverser 7C enables reverser clutch shaft 212 to rotate in the speed variation range caused by HST 6C in each of its normal and reverse rotational directions. As a result, reverser 7C duplicates output speed variation range.

In planetary gear unit 201, the rotational speed of first sun gear 225 fixed on reverser clutch shaft 212 is variable in a range between −2a and 2a, and meanwhile, ring gear 224 is rotated via gears 219 and 224a by the rotation of input shaft 210 at constant speed a and in the constant direction. As a result, the revolution speed of planetary gear members 226 around sun gear 225 is variable between 4a and 0 in only one direction. Here, as understood from FIG. 20, the revolution speed of planetary gear members 226 becomes maximum speed 4a when reverser clutch shaft 212 and sun gear 225 are rotated at speed −2a, i.e., in the reverse direction at speed 2a, and the revolution speed of planetary gear members 226 becomes 0 when reverser clutch shaft 212 and sun gear 225 are rotated at speed 2a, i.e., in the normal direction at speed 2a. Therefore, on an assumption that the gear train of each of the low speed forward traveling gear train and the backward traveling gear train is 1:1, the speed variation of planetary gear members 226 between 4a and 0 is reflected as a variation of rotation speed VS of output shaft 216 between −4a and 0, i.e., in the backward traveling direction between 0 and 4a, when backward traveling clutch 204 is engaged. This range of speed VS is defined by a range 251 in FIG. 20. On assuming that the speed variation of planetary gear members 226 between 4a and 0 is reflected as a variation of rotation speed VS of output shaft 216 between 4a and 0, i.e., in the forward traveling direction between 0 and 4a, when low speed forward traveling clutch 203L is engaged. This range of speed VS is defined by a range 252 in FIG. 20.

The revolution speed of planetary gear members 226 becomes 4a when output rotation speed RS of reverser 7C is −2a (speed 2a of reverse rotation). The revolution speed of planetary gear members 226 becomes 0 when output rotation speed RS of reverser 7C is 2a (speed 2a of normal rotation). However, planetary gear members 226 also rotate centered on their own axes. Due to the rotation of planetary gear members 226 centered on their own axes, sun gear 227 rotates at speed 4a in the forward traveling direction when the revolution speed of planetary gear members 226 is 4a, and sun gear 227 rotates at speed 8a in the forward traveling direction when the revolution speed of planetary gear members 226 is 0. Therefore, the speed range of planetary gear members 226 between 4a and 0 corresponding to the range of output speed RS of reverser 7C between −2a and 2a is reflected as a range of speed VS of output shaft 216 between 4a and 8a, i.e., speed range of rotation in the forward traveling direction between 4a and 8a, when high speed forward traveling clutch 203H is engaged, as defined by a range 253 in FIG. 20.

What is claimed is:

1. A transmission comprising:
   a casing;
   an output element supported by the casing;
   a hydrostatic stepless transmission unit disposed in the casing so as to be driven by a drive source disposed outside of the casing,
   the hydrostatic stepless transmission unit including:
   a pump shaft configured to be drivingly connected to the drive source;
   a motor shaft member disposed coaxially to the pump shaft so as to be rotatable relative to the pump shaft, thereby constituting a hydraulic pump and a hydraulic motor centered on the pump shaft and the motor shaft member,
   wherein an axially distal end of the motor shaft member is disposed on the axially proximal side of an axially distal end of the pump shaft so that axial ends of the pump shaft are the most distal ends of the hydrostatic stepless transmission unit in the axial direction of the pump shaft;
   a cylinder block fixed on the pump shaft, the cylinder block being formed therein with a pump cylinder hole parallel to the pump shaft, a motor cylinder hole parallel to the pump shaft, and a pair of fluid passages interposed between the pump cylinder hole and the motor cylinder hole;
   a pump plunger fitted into the pump cylinder;
   a movable swash plate pressed against the pump plunger;
   a motor plunger fitted into the motor cylinder hole; and
   a swash plate provided on the motor shaft member and pressed against the motor plunger;
   a forward/backward traveling direction selecting unit disposed in the casing so as to transmit power outputted from the hydrostatic stepless transmission unit to the output element,
   the forward/backward traveling direction selecting unit including:
   a forward-traveling drive train;
   a backward-traveling drive train; and
   a clutch for selecting either the forward-traveling drive train or the backward traveling drive train to transmit the power outputted from the motor shaft member to the output element,
   wherein the forward/backward traveling direction selecting unit and the output element are entirely disposed between the axial ends of the pump shaft in the axial direction of the pump shaft.

2. The transmission according to claim 1, further comprising:
   a valve disposed in the cylinder block, wherein the valve changes a flow of fluid in the pair of fluid passages according to tilting movement of the movable swash plate so as to change the rotary speed of the motor shaft member.

3. The transmission according to claim 1, wherein the casing is adapted to be directly attached to an engine serving as the drive source.

4. A transmission comprising:
   a casing;
   an output element supported by the casing;
   a hydrostatic stepless transmission unit disposed in the casing so as to be driven by a drive source disposed outside of the casing,
   the hydrostatic stepless transmission unit including:
   a pump shaft configured to be drivingly connected to the drive source; and
   a motor shaft member disposed coaxially to the pump shaft so as to be rotatable relative to the pump shaft, thereby constituting a hydraulic pump and a hydraulic motor centered on the pump shaft and the motor shaft member,
   wherein an axially distal end of the motor shaft member is disposed on the axially proximal side of an axially distal end of the pump shaft so that axial ends of the pump shaft are the most distal ends of the hydrostatic stepless transmission unit in the axial direction of the pump shaft; and a forward/backward traveling direction selecting unit disposed in the casing so as to transmit power outputted from the hydrostatic stepless transmission unit to the output element, the forward/backward traveling direction selecting unit including:

a forward-traveling drive train;

a backward-traveling drive train; and a clutch for selecting either the forward-traveling drive train or the backward traveling drive train to transmit the power outputted from the motor shaft member to the output element, wherein the forward/backward traveling direction selecting unit and the output element are entirely disposed between the axial ends of the pump shaft in the axial direction of the pump shaft, the casing including:

a first portion incorporating a drive train interposed between the motor shaft member and the forward/backward traveling direction selecting unit; and a second portion incorporating the forward/backward traveling direction selecting unit and the output element, wherein the first portion expands more distally in the axial direction of the pump shaft than the second portion so as to form a step between an outer surface of the first portion and an outer surface of the second portion, and wherein an outer end of the output element is disposed on the outer surface of the second portion.

5. The transmission according to claim 4, further comprising:

an input element supported by the casing so as to be drivingly connected to the drive source and to drive the pump shaft, wherein an outer end of the input element is disposed on an outer end of the casing opposite to the outer surface of the second portion of the casing in the axial direction of the pump shaft.

6. The transmission according to claim 4, further comprising:

a charge pump disposed on the outer surface of the second portion of the casing so as to be juxtaposed with the outer end of the output element.

7. The transmission according to claim 4, wherein the casing is adapted to be directly attached to an engine serving as the drive source.

8. A transmission comprising:

a casing;

an output element supported by the casing;

a hydrostatic stepless transmission unit disposed in the casing so as to be driven by a drive source disposed outside of the casing, the hydrostatic stepless transmission unit including:

a pump shaft configured to be drivingly corn to the drive source; and a motor shaft member disposed coaxially to the pump shaft so as to be rotatable relative to the pump shaft, thereby constituting a hydraulic pump and a hydraulic motor centered on the pump shaft and the motor shaft member, wherein an axially distal end of the motor shaft member is disposed on the axially proximal side of an axially distal end of the pump shaft so that axial ends of the pump shaft are the most distal ends of the hydrostatic stepless transmission unit in the axial direction of the pump shaft;

a forward/backward traveling direction selecting unit disposed in the casing so as to transmit power outputted from the hydrostatic stepless transmission unit to the output element, the forward/backward traveling direction selecting unit including:

a forward-traveling drive train;

a backward-traveling drive train; and a clutch for selecting either the forward-traveling drive train or the backward traveling drive train to transmit the power outputted from the motor shaft member to the output element, wherein the forward/backward traveling direction selecting unit and the output element are entirely disposed between the axial ends of the pump shaft in the axial direction of the pump shaft; and an input element supported by the casing so as to be drivingly connected to the drive source and to drive the pump shaft, wherein the input element, the pump shaft having the motor shaft member therearound, a rotary shaft constituting the forward/backward traveling direction selecting unit, and the output element are aligned on a spiral line centered on the input element when viewed in the axial direction of the pump shaft.

9. The transmission according to claim 8, wherein the casing is adapted to be directly attached to an engine serving as the drive source.

10. A transmission comprising:

a casing;

an output element supported by the casing;

a hydrostatic stepless transmission unit disposed in the casing so as to be driven by a drive source disposed outside of the casing, the hydrostatic stepless transmission unit including:

a pump shaft configured to be drivingly connected to the drive source; and a motor shaft member disposed coaxially to the pump shaft so as to be rotatable relative to the pump shaft, thereby constituting a hydraulic pump and a hydraulic motor centered on the pump shaft and the motor shaft member, wherein an axially distal end of the motor shaft member is disposed on the axially proximal side of an axially distal end of the pump shaft so that axial ends of the pump shaft are the most distal ends of the hydrostatic stepless transmission unit in the axial direction of the pump shaft;

a forward/backward traveling direction selecting unit disposed in the casing so as to transmit power outputted from the hydrostatic stepless transmission unit to the output element, the forward/backward traveling direction selecting unit including:

a forward-traveling drive train;

a backward-traveling drive train; and a clutch for selecting either the forward-traveling drive train or the backward traveling drive train to transmit the power outputted from the motor shaft member to the output element, wherein the forward/backward traveling direction selecting unit and the output element are entirely disposed between the axial ends of the pump shaft in the axial direction of the pump shaft;

a pair of axles extended in the axial direction of the pump shaft and supported by the casing; and a differential unit disposed in the casing so as to transmit power outputted from the forward/backward traveling direction selecting unit to the axles, wherein the differential unit includes a pair of differential yoke shafts, serving as the output element, extended in the axial direction of the pump shaft so as to be drivingly connected to the respective axles, and wherein the differential unit is entirely disposed between the axial ends of the pump shaft in the axial direction of the pump shaft.

11. The transmission according to claim 10, further comprising:

a pair of planetary gear units disposed in the casing so as to be interposed between the respective differential yoke shafts of the differential unit and the respective axles, wherein at least a part of each of the planetary gear units is disposed between the axial ends of the pump shaft in the axial direction of the pump shaft.

* * * * *

UNITED STATES PATENT AND TRADEMARK OFFICE
CERTIFICATE OF CORRECTION

| | |
|---|---|
| PATENT NO. | : 8,806,864 B2 |
| APPLICATION NO. | : 12/914474 |
| DATED | : August 19, 2014 |
| INVENTOR(S) | : Ishii et al. |

It is certified that error appears in the above-identified patent and that said Letters Patent is hereby corrected as shown below:

In the Claims

Claim 8, Column 31, line 57, "corn" should read --connected--.

Signed and Sealed this
Second Day of December, 2014

Michelle K. Lee
*Deputy Director of the United States Patent and Trademark Office*